United States Patent
Mukherjee et al.

(10) Patent No.: US 11,893,991 B2
(45) Date of Patent: *Feb. 6, 2024

(54) SYSTEM AND METHOD FOR HANDLING MULTI-TURN CONVERSATIONS AND CONTEXT MANAGEMENT FOR VOICE ENABLED ECOMMERCE TRANSACTIONS

(71) Applicant: Walmart Apollo, LLC, Bentonville, AR (US)

(72) Inventors: Snehasish Mukherjee, Santa Clara, CA (US); Shankara Bhargava Subramanya, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,636

(22) Filed: Jun. 24, 2022

(65) Prior Publication Data
US 2022/0319518 A1 Oct. 6, 2022

Related U.S. Application Data

(63) Continuation of application No. 16/177,274, filed on Oct. 31, 2018, now Pat. No. 11,404,058.

(51) Int. Cl.
*G06F 17/18* (2006.01)
*G10L 13/00* (2006.01)
(Continued)

(52) U.S. Cl.
CPC .......... *G10L 15/22* (2013.01); *G10L 15/1815* (2013.01); *G10L 2015/223* (2013.01); *G10L 2015/225* (2013.01)

(58) Field of Classification Search
CPC ..... G10L 15/22; G10L 15/1822; G10L 15/26; G10L 2015/223; G10L 15/1815;
(Continued)

(56) References Cited

U.S. PATENT DOCUMENTS 6,144,938 A 11/2000 Surace et al.
6,246,981 B1 6/2001 Papineni et al.
(Continued)

OTHER PUBLICATIONS

Ly, Eric Thich Vi, "Chatter—a conversational telephone agent", 1993, Diss. Massachusetts Institute of Technology, 1993, pp. 1-130.
(Continued)

*Primary Examiner* — Olujimi A Adesanya
(74) *Attorney, Agent, or Firm* — Morgan, Lewis & Bockius LLP; Manita Rawat

(57) ABSTRACT

Systems and methods for e-commerce systems using natural language understanding are described. A computing device is configured receive a user utterance including at least one identified semantic component and at least one missing semantic component and generate a context stack including a set of context entries. Each of the context entries includes a root intent element, an entity list element, and a dialogue stack and each context entry in the set of context entries is associated with one of a user utterance or a system utterance. The computing device is further configured to review at least one context entry in the set of context entries to locate the at least one missing semantic element within the dialogue stack and generate an intent flow execution request including the at least one semantic element from the first speech data and the missing semantic element.

19 Claims, 14 Drawing Sheets

(51) Int. Cl.
*G10L 15/16* (2006.01)
*G10L 15/22* (2006.01)
*G10L 15/18* (2013.01)

(58) Field of Classification Search
CPC ... G10L 2105/225; G10L 15/00; G10L 15/24; G06F 16/3329; G06F 40/56; G06F 40/284; G06F 16/90332; G06F 16/3344; G06F 40/205
See application file for complete search history.

(56) References Cited

U.S. PATENT DOCUMENTS

| | | | |
|---|---|---|---|
| 6,757,362 | B1 | 6/2004 | Cooper et al. |
| 6,785,651 | B1 | 8/2004 | Wang |
| 7,778,889 | B2 | 8/2010 | Bell et al. |
| 7,962,920 | B2 | 6/2011 | Gabriel et al. |
| 8,078,507 | B1 | 12/2011 | Rao et al. |
| 8,473,451 | B1 | 6/2013 | Hakkani-Tur et al. |
| 8,543,535 | B2 | 9/2013 | Satpathy et al. |
| 8,660,849 | B2 | 2/2014 | Gruber et al. |
| 9,070,366 | B1 | 6/2015 | Mathias et al. |
| 9,165,028 | B1 | 10/2015 | Christensen et al. |
| 9,734,826 | B2 | 8/2017 | Levit et al. |
| 9,858,045 | B2 | 1/2018 | Grebnov et al. |
| 9,875,081 | B2 | 1/2018 | Meyers et al. |
| 10,181,322 | B2 | 1/2019 | Hakkani-Tur et al. |
| 10,229,680 | B1 | 3/2019 | Gillespie et al. |
| 10,418,032 | B1 | 9/2019 | Mohajer et al. |
| 10,572,811 | B2 | 2/2020 | Nguyen et al. |
| 10,629,186 | B1 | 4/2020 | Slifka |
| 10,684,738 | B1 | 6/2020 | Sicora et al. |
| 10,713,289 | B1 | 7/2020 | Mishara et al. |
| 10,811,013 | B1 | 10/2020 | Secker-Walker et al. |
| 10,860,588 | B2 | 12/2020 | Lyubimov et al. |
| 11,195,524 | B2 | 12/2021 | Mukherjee et al. |
| 11,238,850 | B2 | 2/2022 | Mukherjee et al. |
| 2003/0220803 | A1 | 11/2003 | Giaquinto et al. |
| 2003/0229628 | A1 | 12/2003 | Banerjee et al. |
| 2005/0033582 | A1 | 2/2005 | Gadd et al. |
| 2005/0114367 | A1 | 5/2005 | Serebrennikov |
| 2006/0095332 | A1 | 5/2006 | Riemann et al. |
| 2006/0212841 | A1 | 9/2006 | Sinai et al. |
| 2007/0033005 | A1* | 2/2007 | Cristo ............ G10L 15/19 704/9 |
| 2007/0156392 | A1 | 7/2007 | Balchandran et al. |
| 2008/0005727 | A1 | 1/2008 | Morris |
| 2008/0091406 | A1* | 4/2008 | Baldwin ............ G06F 3/167 704/4 |
| 2008/0091413 | A1 | 4/2008 | El-Shishiny et al. |
| 2009/0150156 | A1 | 6/2009 | Kennewick et al. |
| 2009/0150908 | A1 | 6/2009 | Shankaranarayanan et al. |
| 2010/0030734 | A1 | 2/2010 | Chunilal |
| 2010/0179956 | A1 | 7/2010 | Jammalamadaka et al. |
| 2011/0231182 | A1* | 9/2011 | Weider ............ G06F 16/951 704/9 |
| 2012/0117092 | A1 | 5/2012 | Stankiewicz et al. |
| 2012/0290509 | A1 | 11/2012 | Heck et al. |
| 2013/0275164 | A1 | 10/2013 | Gruber et al. |
| 2014/0136212 | A1 | 5/2014 | Kwon et al. |
| 2014/0149399 | A1 | 5/2014 | Kurzion |
| 2014/0188935 | A1 | 7/2014 | Vee et al. |
| 2014/0244712 | A1* | 8/2014 | Walters ............ G06Q 30/02 709/202 |
| 2015/0039316 | A1 | 2/2015 | Tzirkel-Hancock et al. |
| 2015/0142704 | A1 | 5/2015 | London |
| 2015/0178371 | A1 | 6/2015 | Seth et al. |
| 2015/0302002 | A1* | 10/2015 | Mathias ............ G06F 40/56 704/9 |
| 2015/0340031 | A1 | 11/2015 | Kim et al. |
| 2015/0340033 | A1 | 11/2015 | De Fabbrizio et al. |
| 2015/0379984 | A1* | 12/2015 | Stent ............ G10L 15/063 704/240 |
| 2016/0234568 | A1 | 8/2016 | Grusd |
| 2017/0004422 | A1 | 1/2017 | Todd et al. |
| 2017/0140755 | A1* | 5/2017 | Andreas ............ G10L 25/51 |
| 2017/0162197 | A1* | 6/2017 | Cohen ............ G10L 15/22 |
| 2017/0270929 | A1 | 9/2017 | Aleksic et al. |
| 2017/0372200 | A1* | 12/2017 | Chen ............ G06N 3/044 |
| 2018/0004729 | A1 | 1/2018 | Qiu et al. |
| 2018/0012594 | A1 | 1/2018 | Behzadi et al. |
| 2018/0039909 | A1 | 2/2018 | Sadoddin et al. |
| 2018/0060301 | A1 | 3/2018 | Li et al. |
| 2018/0061404 | A1 | 3/2018 | Devaraj et al. |
| 2018/0075847 | A1* | 3/2018 | Lee ............ G06F 16/24522 |
| 2018/0137854 | A1 | 5/2018 | Perez |
| 2018/0165379 | A1 | 6/2018 | Ramnani et al. |
| 2018/0174020 | A1 | 6/2018 | Wu |
| 2019/0066668 | A1 | 2/2019 | Lin et al. |
| 2019/0138436 | A1 | 5/2019 | Gschwind |
| 2019/0138648 | A1 | 5/2019 | Gupta et al. |
| 2019/0156198 | A1 | 5/2019 | Mars et al. |
| 2019/0188319 | A1 | 6/2019 | Anerousis et al. |
| 2019/0189117 | A1 | 6/2019 | Kumar |
| 2019/0244603 | A1 | 8/2019 | Angkititrakul et al. |
| 2020/0034480 | A1 | 1/2020 | Kazmaier et al. |
| 2020/0042211 | A1 | 2/2020 | Rogulenko |
| 2020/0135180 | A1 | 4/2020 | Mukherjee et al. |
| 2020/0143814 | A1 | 5/2020 | Moniz |
| 2020/0168214 | A1 | 5/2020 | Mukherjee et al. |
| 2020/0202847 | A1 | 6/2020 | Mukherjee et al. |
| 2020/0251091 | A1 | 8/2020 | Zhao |
| 2021/0027785 | A1* | 1/2021 | Kahan ............ G06F 16/433 |

OTHER PUBLICATIONS

Zhao, "Reinforest: Multi-domain dialogue management using hierarchical policies and knowledge ontology", 2016, in CMU-LTI-16-006. Language Technologies Institute Carnegie Mellon University; Apr. 4, 2016.

* cited by examiner

SYSTEM AND METHOD FOR HANDLING MULTI-TURN CONVERSATIONS AND CONTEXT MANAGEMENT FOR VOICE ENABLED ECOMMERCE TRANSACTIONS

CROSS-REFERENCE TO RELATED APPLICATIONS

This application is a continuation of, and claims priority to, U.S. application Ser. No. 16/177,274 filed on Oct. 31, 2018 and entitled "System and Method for Handling Multi-Turn Conversations and Context Management for Voice Enabled Ecommerce Transactions."

TECHNICAL FIELD

This application relates generally to natural language interfaces, and more particularly, to natural language-based e-commerce interfaces.

BACKGROUND

Natural language processing refers to the ability of a system, such as a computer system, to recognize and interpret human speech. Natural language processing can understand user utterances (e.g., spoken user sentences, phrases, etc.) and can include steps such as speech recognition, syntax processing, semantic processing, and discourse generation. The use of natural language processing allows users to interact with systems without the need to use specialized input devices (e.g., keyboard, mouse, etc.). Natural language processing has become the de facto input method for many internet-enabled and/or internet-of-things (IoT) devices, such as digital assistants (e.g., Siri, Cortana, Google Home, Alexa, etc.) and smart devices.

Although, current natural language systems are designed to provide responses to general queries and handle certain specific tasks, current systems provide very limited contextual recall and make conversations sound robotic. Current systems provide unnatural responses, are not able to reference prior utterances to identify known information, and are not able to identify previously provided contextual information. Further, current digital assistants and smart devices exist in "walled gardens" in which each digital assistant or smart device provides certain capabilities only for systems using the identical software and/or hardware.

SUMMARY OF THE INVENTION

In various embodiments, a system including a computing device is disclosed. The computing device is configured to receive a user utterance including at least one identified semantic component and at least one missing semantic component and generate a context stack including a set of context entries. Each of the context entries includes a root intent element, an entity list element, and a dialogue stack and each context entry in the set of context entries is associated with one of a user utterance or a system utterance. The computing device is further configured to review at least one context entry in the set of context entries to locate the at least one missing semantic element within the dialogue stack and generate an intent flow execution request including the at least one semantic element from the first speech data and the missing semantic element.

In various embodiments, a method is disclosed. The method includes receiving a user utterance including at least one identified semantic component and at least one missing semantic component and generating a context stack including a set of context entries. Each of the context entries comprises a root intent element, an entity list element, and a dialogue stack and each context entry in the set of context entries is associated with one of a user utterance or a system utterance. At least one context entry in the set of context entries is reviewed to locate the at least one missing semantic element within the dialogue stack and an intent flow execution request including the at least one semantic element from the first speech data and the missing semantic element is generated.

In various embodiments, a non-transitory computer readable medium having instructions stored thereon. The instructions, when executed by a processor cause a device to perform operations including receiving a user utterance including at least one identified semantic component and at least one missing semantic component and generating a context stack including a set of context entries. Each of the context entries comprises a root intent element, an entity list element, and a dialogue stack and each context entry in the set of context entries is associated with one of a user utterance or a system utterance. The operations further include reviewing at least one context entry in the set of context entries to locate the at least one missing semantic element within the dialogue stack and generating an intent flow execution request including the at least one semantic element from the first speech data and the missing semantic element.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
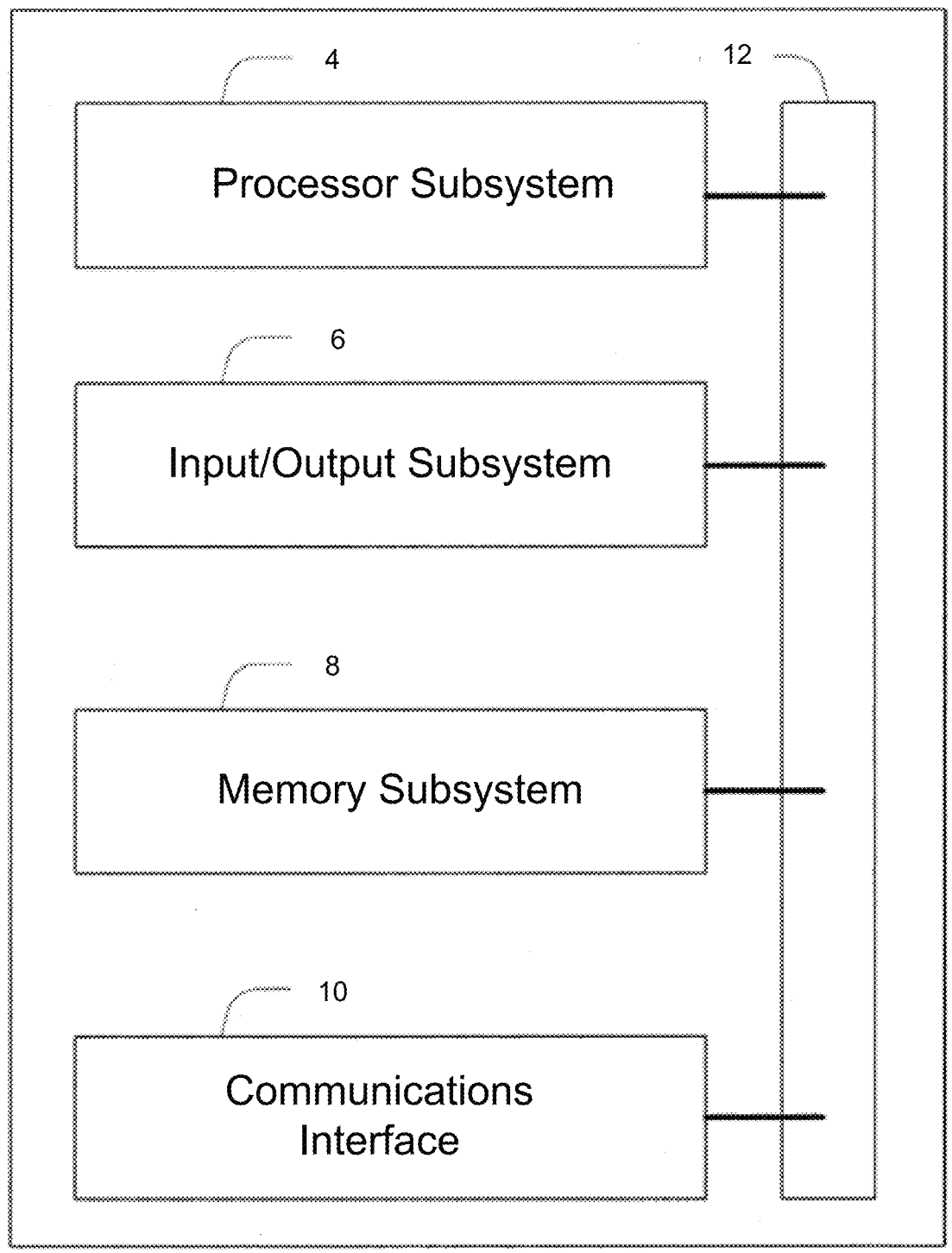
FIG. 1 illustrates a block diagram of a computer system, in accordance with some embodiments.

FIG. 1 illustrates a computer system 2 configured to implement one or more processes, in accordance with some embodiments. The computer system 2 is a representative device and may include a processor subsystem 4, an input/output subsystem 6, a memory subsystem 8, a communications interface 10, and/or a system bus 12. In some embodiments, one or more than components of the computer system 2 can be combined or omitted such as, for example, omitting the input/output subsystem 6. In some embodiments, the computer system 2 includes one or more additional components not shown in FIG. 1, such as, for example, a power subsystem. The computer system 2 may include two or more instances of one or more of the components 4-12 shown in FIG. 1. For example, the computer system 2 may include two or more memory subsystems 8. For the sake of conciseness and clarity, and not limitation, one of each of the components is shown in FIG. 1.

In various embodiments, the processor subsystem 4 includes processing circuitry operative to perform one or more functions of the computer system 2. The processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, a very long instruction word (VLIW) microprocessor, and/or other suitable processing device. The processor subsystem 4 may also be implemented by a controller, a microcontroller, an application specific integrated circuit (ASIC), a field programmable gate array (FPGA), a programmable logic device (PLD), and so forth.

In various embodiments, the processor subsystem 4 is arranged to run an operating system (OS) and/or various applications. Examples of an OS include, for example, operating systems generally known under the trade name of Apple OS, Microsoft Windows OS, Android OS, Linux OS, and any other proprietary or open source OS. Examples of applications include, for example, network applications, local applications, data input/output applications, user interaction applications, natural language processing applications, e-commerce applications, etc.

In some embodiments, the computer system 2 includes a system bus 12 that couples various components including, for example, the processing subsystem 4, the input/output subsystem 6, and/or the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, and/or any custom bus suitable for computing device applications.

In some embodiments, the input/output subsystem 6 includes one or more mechanisms or components to enable a user to provide input to the computer system 2 and for the computer system 2 to provide output to the user. For example, the input/output subsystem 6 may include a button, keypad, keyboard, click wheel, touch screen, motion sensor, microphone, camera, etc. In some embodiments, the input/output subsystem 6 includes a visual peripheral output device for providing a display visible to the user. The visual peripheral output device may include a screen such as, for example, a Liquid Crystal Display (LCD) screen. As another example, the visual peripheral output device may include a movable display or projecting system for providing a display of content on a surface remote from the computer system 2. The input/output subsystem 6 may further include an audible output device, such as a speaker, configured to convert received signals to audible output. In some embodiments, the input/output subsystem 6 includes coder/decoders, also known as Codecs, to convert digital media data into analog signals. For example, the visual peripheral output device may include video Codecs, audio Codecs, or any other suitable type of Codec.

Figure 2:
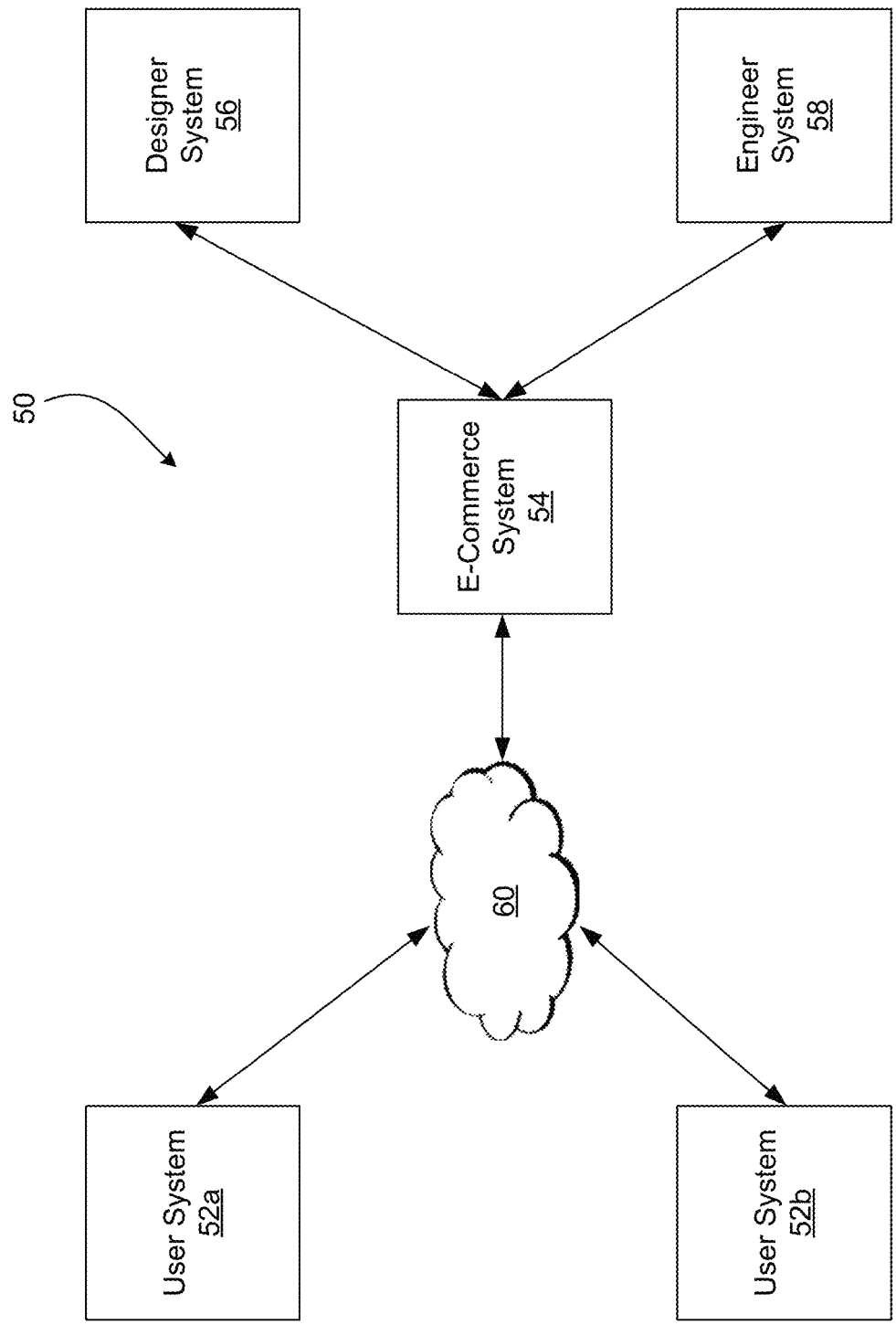
FIG. 2 illustrates a networked environment configured to implement a voice-based e-commerce environment, in accordance with some embodiments.

In some embodiments, the communications interface 10 includes hardware and/or software capable of coupling the computer system 2 to one or more networks and/or additional devices, such as the network 50 illustrated in FIG. 2. The communications interface 10 may be arranged to operate with any suitable technique for controlling information signals using a desired set of communications protocols, services or operating procedures. The communications interface 10 may include the appropriate physical connectors to connect with a corresponding communications medium, whether wired or wireless, such as a wired and/or wireless network.

In various aspects, the network may include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments can include various devices, and various modes of communications such as wireless communications, wired communications, and/or combinations of the same.

Wireless communication modes include any mode of communication between points (e.g., nodes) that utilize, at least in part, wireless technology including various protocols and combinations of protocols associated with wireless transmission, data, and devices. Wired communication modes include any mode of communication between points that utilize wired technology including various protocols and combinations of protocols associated with wired transmission, data, and devices. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may include a wireless interface having one or more antennas, transmitters, receivers, transceivers, amplifiers, filters, control logic, and so forth.

In various aspects, the communications interface 10 may provide data communications functionality in accordance with a number of protocols. Examples of protocols may include various wireless local area network (WLAN) protocols, including the Institute of Electrical and Electronics Engineers (IEEE) 802.xx series of protocols. Other examples of wireless protocols may include various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, etc. Further examples of wireless protocols may include wireless personal area network (PAN) protocols, such as an Infrared protocol, a protocol from the Bluetooth Special Interest Group (SIG) series of protocols, etc. Yet another example of wireless protocols includes near-field communication techniques and protocols, such as electro-magnetic induction (EMI) techniques, such as passive or active radio-frequency identification (RFID) protocols and devices. Other suitable protocols may include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 includes machine-readable or computer-readable media capable of storing data, including both volatile/non-volatile memory and removable/non-removable memory. The memory subsystem 8 may include at least one non-volatile memory unit capable of storing one or more software programs. The software programs may contain, for example, applications, user data, device data, and/or configuration data, or combinations therefore, to name only a few. The software programs may contain instructions executable by the various components of the computer system 2.

In various aspects, the memory subsystem 8 may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), and/or any other type of machine-readable media.

In some embodiments, the memory subsystem 8 includes an instruction set, in the form of a file for executing various system components, such as components of a voice-enabled e-commerce platform, as described herein. The instruction set may be stored in any acceptable form of machine readable instructions, including source code and/or various appropriate programming languages. Some examples of programming languages that may be used to store the instruction set include, but are not limited to: Java, C, C++, C#, Python, Objective-C, Visual Basic, .NET programming, etc. In some embodiments a compiler or interpreter is configured to convert the instruction set into machine executable code for execution by the processing subsystem 4.

FIG. 2 illustrates a networked environment 50 configured to enable natural language e-commerce, in accordance with some embodiments. The networked environment 50 includes at least one user system 52a, 52b, at least one e-commerce system 54, at least one designer system 56, at least one engineer system 58, and/or any other suitable systems. Each of the systems 52-58 can include a computer system, such as the computer system 2 described above in conjunction with FIG. 1. It will be appreciated that each of the systems 52-58 can include generic systems and/or special purpose systems, and are within the scope of this disclosure.

In some embodiments, each of the systems 52-58 are configured to exchange data over one or more networks, such as network 60. For example, in some embodiments, the user system 52 (and/or any other system) is configured to receive speech input from a user and provide the received speech input to the e-commerce system 54. The e-commerce system 54 is configured to provide speech-enable e-commerce services, as discussed in greater detail below with respect to FIGS. 3-13. In some embodiments, the e-commerce system 54 implements a natural language conversation architecture to receive speech input data, extract an intent and/or one or more entities, execute one or more identified intents (or subtasks), and/or generate an appropriate response. In some embodiments, the natural language conversation architecture can include a natural language understanding component, a context mining component, an intent handler, and/or a response generator, as discussed in greater detail below. Although embodiments are discussed herein including specific systems and/or configurations, it will be appreciated that the networked environment 50 can include any number of systems, can combine one or more of the identified systems, and/or can include additional or alternative systems, in various embodiments.

Figure 3:
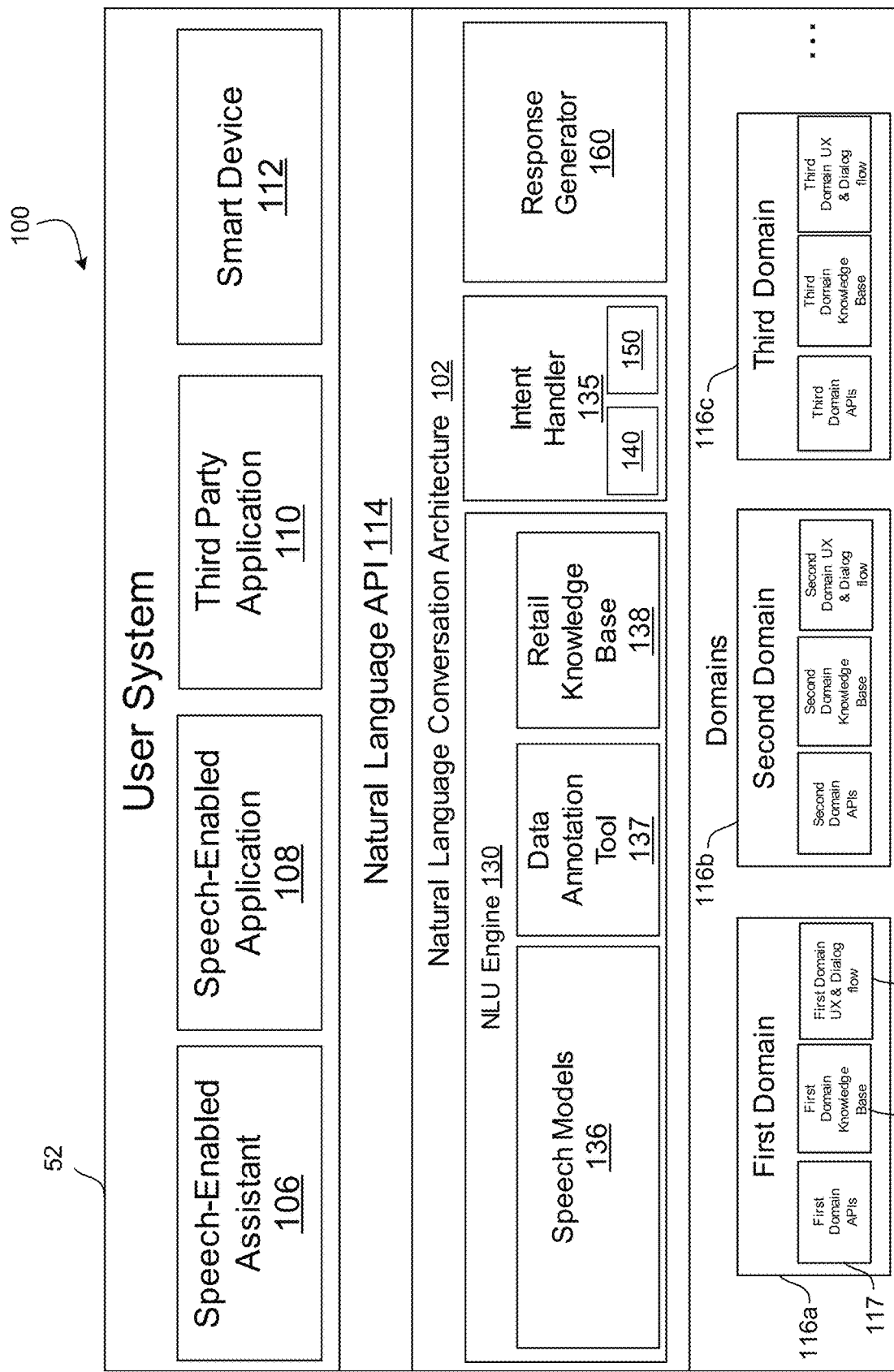
FIG. 3 illustrates a voice-based e-commerce environment including a natural language conversation architecture configured to provide voice-enabled e-commerce services, in accordance with some embodiments.

FIG. 3 illustrates a speech-enabled e-commerce environment 100 including a natural language conversation architecture 102 configured to provide speech-enabled e-commerce services, in accordance with some embodiments. The speech-enabled e-commerce environment 100 includes at least one user system 52 configured to receive speech input from a user and convert the speech input into one or more computer-readable signals. Each user system 52 includes a speech recognition front-end configured to receive audio signals from a user, for example via a microphone, and convert the received audio into computer-readable digital signals. The speech recognition front-end can include a speech-enabled assistant, a speech-enabled application, generic speech-recognition software integrated with one or more applications, smart devices, and/or any other suitable speech recognition front-end.

For example, in various embodiments, a user system 52 can include at least one speech-enabled assistant 106, such as Amazon Alexa, Ski, Google Home, Microsoft Cortana, etc., and/or any other suitable voice and/or speech enabled assistant. The speech enabled assistant 106 is configured to receive speech input from a user, convert the speech input to digital signals, and may be configured to perform one or more actions in response to recognized speech in the speech input. In some embodiments, the speech-enabled assistant 106 is configured to communicate with the natural language e-commerce architecture 102 to provide a speech-enabled e-commerce experience to a user, as described in greater detail below.

As another example, in some embodiments, a user system 52 can include a speech-enabled application 108, such as an e-commerce application associated with a specific retailer, platform, product, vendor, etc. The speech-enabled application 108 is configured to receive speech input from the user and provide speech data to the natural language conversation architecture 102.

As yet another example, in some embodiments, a user system 52 can include general purpose speech recognition software 110 integrated with one or more additional applications or devices. For example, a user system 104 can include voice recognition software such as one or more of the Dragon line of products available from Nuance Communications, Inc., one or more of the Fluency line of products available from MModal, Inc., Voice Finger, PenPower ViaTalk, Tatzi, e-speaking, and/or any other suitable speech-recognition software. The speech recognition software 110 is integrated with one or more additional programs implemented by the user system 104, such as, for example, web-based applications, mobile application, smart device applications, and/or any other suitable software. Integration between the general purpose voice recognition software 110 and at least one additional program, such as a web browser, provides a user front-end for interaction with the natural language conversation architecture 102.

As still another example, in some embodiments, a user system 52 can include a speech-enabled smart device 112 having one or more circuits and/or software programs configured for speech recognition. As used herein, the term "smart device" is used to denote any electronic and/or partially electronic device configured to operate interactively and/or at least partially autonomously. In some embodiments, a speech-enabled smart device 112 may include one or more speech-enabled assistants, one or more special purpose speech recognition circuits, and/or any other suitable speech recognition system. For example, in various embodiments, the user system 104 can include a smart speaker, such as, but not limited to, Amazon Echo, Google Home, Sonos One, Apple HomePod, etc. As another example, in various embodiments, the user system 104 can include any suitable speech-enabled device, such as a smart television, smart appliance, smart home hub, etc.

In some embodiments, an e-commerce system 54 provides a natural language conversation architecture 102 including a natural language application programming interface (API) 114 configured to receive and/or provide speech data and/or other data to and from the user system 52, e.g., to and from the speech-recognition front-end. As discussed in greater detail below, in some embodiments, the natural language conversation architecture 102 includes a plurality of adapters 122a-122c (see FIG. 4) each configured to communicate with one or more predetermined speech-recognition front-ends. Each adapter 122a-122c converts the received speech and/or other data into a common format and provides the received data to the conversation API 114, which communications with one or more additional elements of the natural language conversation architecture 102 to provide a speech-enabled e-commerce platform. Similarly, each adapter 122a-122c is configured to receive speech output from the natural language conversation architecture 102 and convert the speech output into a form suitable for the user system 52.

In some embodiments, the natural language conversation architecture 102 includes a natural language understanding (NLU) engine 130, an intent handler 135 (including a context mining component 140 and a task stitching component 150), and a response generation component 160. The NLU engine 130, the intent handler 140, and the response generator component 160 cooperate to provide a conversational e-commerce interaction with a user through the user system 104. For example, in some embodiments, the natural language conversation architecture 102 is configured to receive natural language input from a user (via the user system 52, speech-enabled front end, and conversation API 114), extract an intent and/or one or more entities from the user speech, execute an identified intent, and/or generate one or more responses in response to the processed intent.

Each user utterance received by the natural language conversation architecture 102 may include an intent and/or one or more entities associated with an intent. As used herein, the term intent refers to an action or task that the user wants the system to complete. For example, in an e-commerce environment, possible intents may include, but are not limited to, an add-to-cart intent to add one or more products to a user cart, a product information request intent, a cart information request intent, a clarification intent, a cancel intent, a shipping information request intent, a complete purchase intent, a modify cart intent, etc. As one example, a conversation between a user and the natural language conversation architecture 102 of an e-commerce environment 100 may include the following utterances:

| | |
|---|---|
| User: Add apples to cart. | [1] |
| System: How many? | [2] |
| User: How many can I add? | [3] |
| System: Ten. | [4] |
| User: Ok, add four. | [5] |
| System: Ok, added four apples to your cart. | [6] |

Utterance [1], provided by the user, includes an "add-to-cart" intent, e.g., the user wishes to add apples to their cart. The NLU engine 130 parses the user utterance and identifies the add-to-cart intent. The NLU engine 130 further identifies an entity associated with the "add to cart" action, i.e., a product (apples). As used herein, the term entity refers to a variable or facet of a user-requested intent that is required to complete an action. For example, examples of entities in an e-commerce environment include, but are not limited to, a count entity, a size entity, a brand entity, a product entity, a price entity, a domain entity, a department entity etc.

In some embodiments, each required entity for executing an intent is included in a single utterance. When a required entity is not present in an utterance including an intent, the NLU engine 130 identifies the missing entities and invokes the intent handler 135 and the response generator component 160a to identify the missing entities in prior utterances and/or generate a slot filling response to request the missing entity. In the above example, the natural language conversation architecture 102 generates a slot filling request to identify how many apples should be added to the cart, statement [2] above. The slot filling response is provided to the natural language API 114, which provides the response to the speech-enabled frontend of the user system 52. The user system 52 converts the response into machine-spoken audio for the user.

After generating a slot filling response, the natural language conversation architecture 102 expects the user to respond with an utterance including a quantity entity. However, in the above example, the user responds with an utterance [3] containing a new intent, i.e., a product information intent. The NLU engine 130 identifies the product information intent in utterance [3], but does not identify a product entity (which is required to execute the product information intent), i.e., the user has omitted the product apples. The NLU engine 130 determines that a product entity is missing from utterance [3] and invokes a context mining element 140 (for example, through a context mining plugin) to review previous utterances in the conversation and attempt to identify the missing entity, as discussed in greater detail below. In the above example, the context mining element 140 identifies a product identification in statement [1] of the conversation, specifically, apples. After identifying the missing entity, the natural language conversation architecture 102a invokes the intent handle 135 to determine a execute a task to identify how many apples a user can add to a cart and invokes the response generation component 160 to generate a response including an answer to the user's query, i.e., utterance [4].

The user responds with utterance [5], e.g., "add four." The NLU engine 130 identifies the intent of the statement, i.e., an "add-to-cart" intent. As discussed in greater detail below, in some embodiments, the natural language conversation architecture 102 is configured to associate the add-to-cart intent in utterance [5] with the prior add-to-cart intent in utterance [1]. The NLU engine 130 further identifies a required entity of the add-to-cart intent, specifically, a quantity of four. However, the NLU engine 130 determines that a second required entity, i.e., a product entity, is missing from utterance [5]. As discussed above, the natural language conversation architecture 102a utilizes the context mining component 140 to review prior utterances and identify missing entities that were provided in the prior utterances. In the instant example, the context mining component 140 identifies a product, apples, in utterance [1]. After identifying all required entities, the intent handler 135 is invoked to process the add-to-cart intent according to a predetermined intent flow generated by a designer and/or engineer, as discussed in greater detail below. After completing the add-to-cart intent, the response generation component 160 generates a success response indicating the add-to-cart intent was executed successfully, i.e., statement [6].

In some embodiments, the natural language conversation architecture 102 includes a plurality of knowledge domains 116a-116c configured to provide domain-specific APIs 117, a domain-specific knowledge base 118 (e.g., intents, entities, interface elements, inventory, speech models), domain specific flows 119 (e.g., dialogue flows, task flows, intent flows) and/or other domain-specific data. For example, in various embodiments, the plurality of knowledge domains 116a-116c can include physical product knowledge domains such as domains associated with groceries, home goods, sporting goods, etc., digital product knowledge domains such as domains associated with digital videos, music, books, etc., company/vendor specific knowledge domains associated with a specific company, line of products, vendor, etc., department specific knowledge domains associated with specific collections of products denoted by a retailer such as pharmacy products, in-store products, on-line only products, etc., and/or any other suitable knowledge domains. In some embodiments, the natural language conversation architecture 102 utilizes domain-specific data within each of the plurality of knowledge domains 116a-116c to process received speech input, identify intents and/or entities included in the speech input, execute one or more intents or tasks, and/or generate one or more responses, each of which is discussed in greater detail below.

Figure 4:
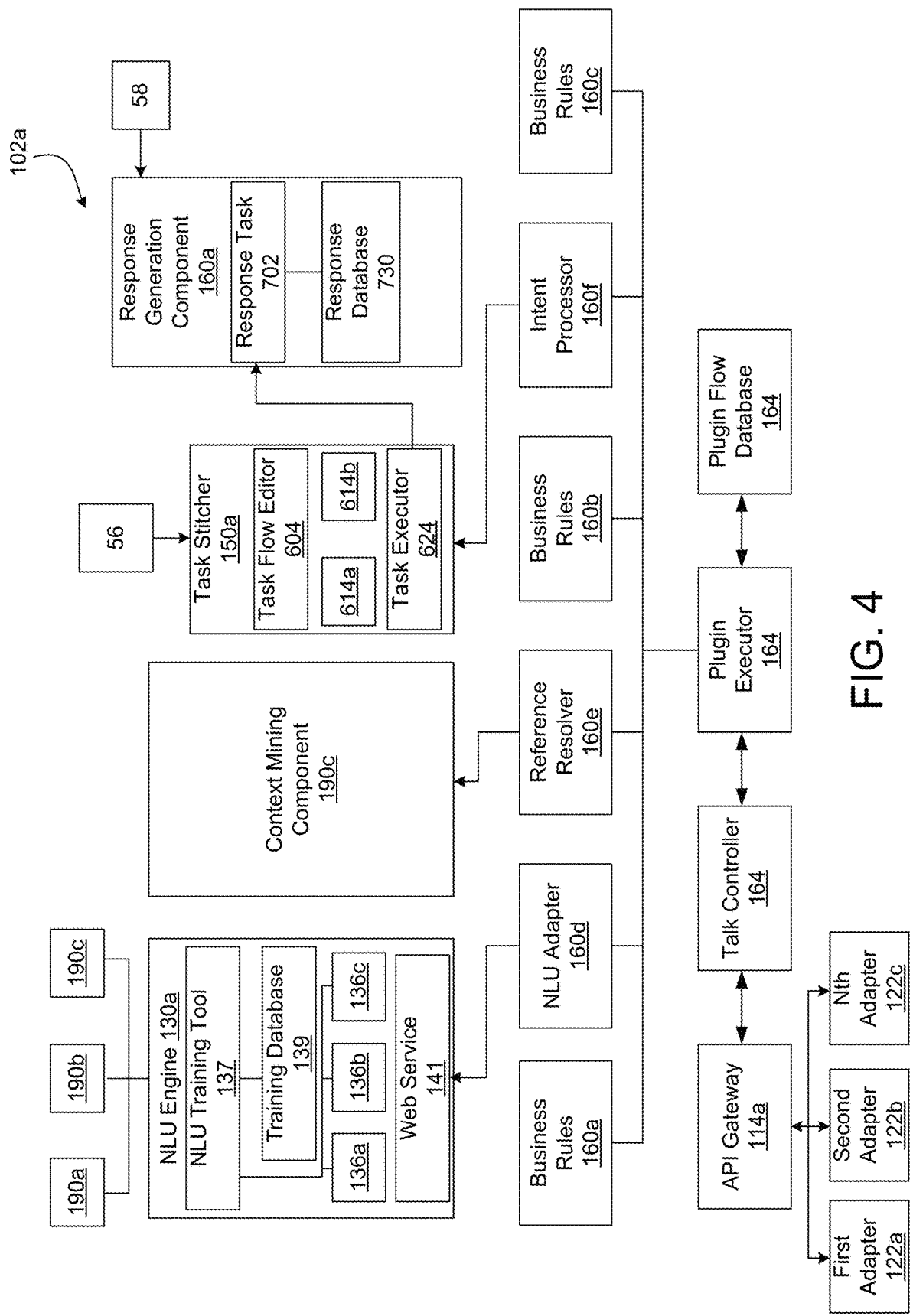
FIG. 4 illustrates a natural language conversation architecture implemented by the voice-based e-commerce environment of FIG. 1, in accordance with some embodiments.

FIG. 4 illustrates a system diagram of one embodiment of the natural language conversation architecture 102a, in accordance with some embodiments. The natural language conversation architecture 102a is similar to the natural language conversation architecture 102 discussed in conjunction with FIG. 3, and similar description is not repeated herein. In some embodiments, the natural language conversation architecture 102a includes a natural language API 114a including one or more adapters 122a-122c. Each adapter 122a-122c is configured to interact with a predetermined speech-enabled frontend, such as, for example, a speech-enabled assistant. In the illustrated embodiment, a first adapter 122a is configured to interact with a first speech-enabled assistant such as, for example, Google Home, a second adapter 122b is configured to interact with a second speech-enabled assistant, such as, for example, Microsoft Cortana, and a third adapter 122c is configured to interact with a third speech-enabled assistant, such as, for example, Apple Siri. Although each of the illustrated adapters 122a-122c is configured to interact with a specific speech-enabled assistant, it will be appreciated that the conversation API 114a can include any number of adapters 122a-122c configured to interact with any number of speech-enabled frontends, such as, for example, speech-enabled assistants, programs, systems, devices, etc.

In some embodiments, each adapter 122a-122c is configured to convert platform-specific data (such as speech data) to data formatted for use by the natural language conversation architecture 102a. For example, in some embodiments, each adapter 122a-122c is associated with a specific speech-enabled assistant having a predetermined set of capabilities, functions, response, etc. The use of adapters 122a-122c makes the natural language conversation architecture 102a platform-agnostic and allows the use of multiple third party platforms, programs, systems, devices, etc., without needing to update the entire natural language conversation architecture 102a for each new third party speech-enabled system.

After conversion, the now platform-agnostic speech input is provided to a talk controller 162a and further to a plugin executor 164 configured to execute one or more plugins 160a-160d. In some embodiments, the plugins 160a-160d include one or more business rule plugins 160a-1160c, an NLU adapter plugin 160d, a reference resolver plugins 160e, an intent processor plugins 160f, and/or any other suitable plugins. The plugin executor 164 is configured to execute each of the plugins 160a-160d in a predetermined order. For example, the plugin executor 164 may be configured to execute each of the plugins 160a-160f in a predetermined sequential (i.e., serial) order, a predetermined parallel and/or partially parallel order, and/or any other suitable order. A plugin flow (i.e., order of execution) may be stored in and/or retrieved from a plugin flow database 165. In some embodiments, the plugin flow is tailored to a predetermined environment, such as an e-commerce environment.

In some embodiments, the business rule plugins 160a-160c are configured to apply one or more rules to an input prior to providing the input to one or more additional plugins 160d-160f. The business rule plugins 160a-160c can be configured to provide rules, work flows, and/or other processing specifications for a predetermined domain and/or environment. For example, in the illustrated embodiment, the first business rule plugin 160a is configured to provide natural language processing rules for an e-commerce environment 100, such as retailer-specific, environment-specific, and/or other predetermined rules. The business rules may include one or more intents, associated entities, and/or other elements for interaction with the natural language conversation architecture 102a. Similarly, the second instance of the business rule plugin 160b may provide domain-specific rules for executing one or more intents and/or tasks identified by the NLU engine 130a and/or for generating one or more domain-specific or domain-modified responses. The third instance of the business rule plugin 160c may provide domain-specific and/or environment-specific rules for post-intent and/or post-response tasks.

Figure 5:
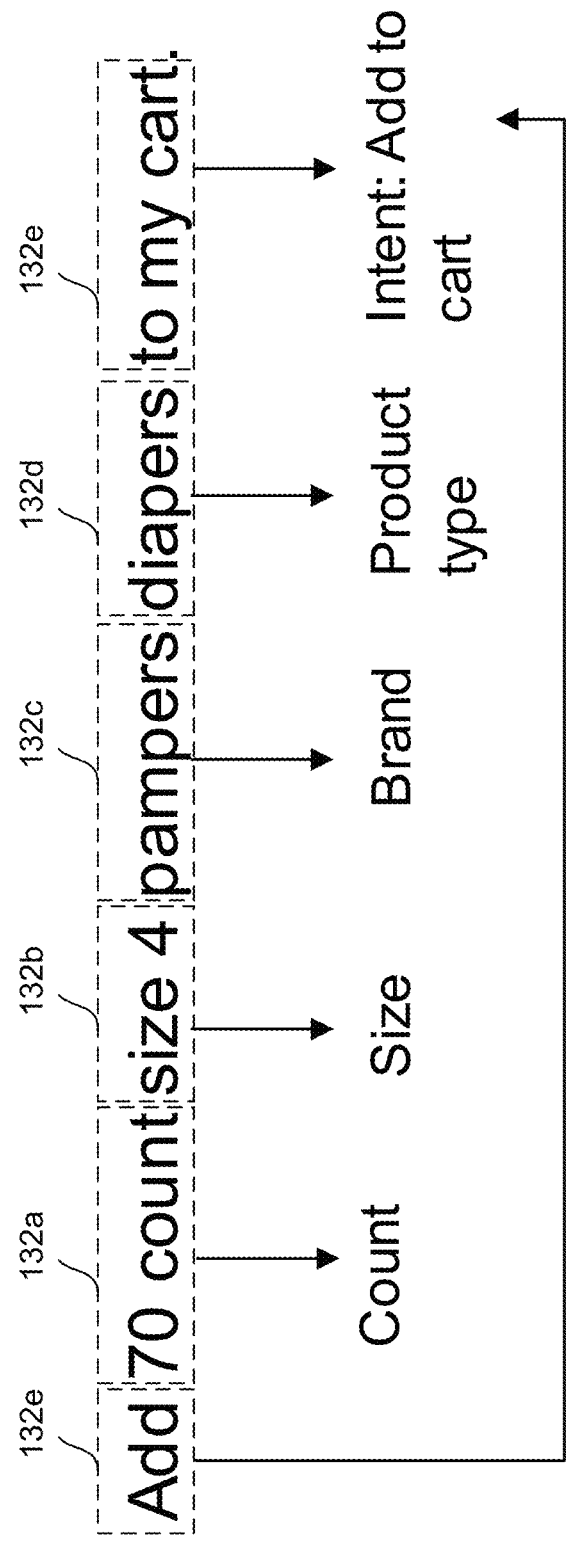
FIG. 5 illustrates a sentence parsed by a natural language understanding component of the natural language conversation architecture of FIG. 4, in accordance with some embodiments.

In some embodiments, the NLU adapter plugin 160d is configured to invoke an NLU Engine 130a. The NLU engine 130a is configured to perform natural language processing and understanding on received speech input (e.g., as recognized by the user system 104 and/or the natural language API 114) to generate a computer-readable representation of the content of the user's speech. In some embodiments, the NLU engine 130a is configured to identify and parse user utterances to identify predetermined components of the user utterance. For example, as illustrated in FIG. 5, the NLU engine 130a may be configured to identify semantic entities (or components) 132a-132e within a single user utterance 134, such as, for example, a "count" component 132a, a "size" component 132b, a "brand" component 132c, a "product type" component 132d, an "intent" component 132e, and/or any other suitable components. Although specific embodiments are discussed herein, it will be appreciated that the components can include any suitable components identified by a business rule, speech model, etc., such as, for example, based on specific market segments, departments, and/or any other suitable grouping of products or services provided by an e-commerce platform.

As illustrated in FIG. 5, the NLU engine 130a is configured to identify both single-word and multiple-word semantic components. For example, in the illustrated embodiment, the NLU engine 130a identifies each of a count component, a size component, a brand component, and a product type component that are a single word or number. In addition, the NLU engine 130a identifies an intent component 132e that includes three words. In some embodiments, one or more semantic components, such as the intent component 132e, can include multiple words, numbers, etc. that are continuous and/or discontinuous within the user utterance 134. Each of the semantic components 132a-132e can include single-element and/or multi-element semantic components.

In some embodiments, after parsing and identifying the semantic components 132a-132e within the user utterance 134, the natural language conversation architecture 102a is configured to identify a user intent. For example, the natural language conversation architecture 102a can be configured to identify a user request to perform one or more actions, such as searching for one or more products within an e-commerce environment, adding one or more products to a cart, completing a purchase, receiving shipping information, etc. In some embodiments, the natural language conversation architecture 102a uses one or more data structures configured to store and/or identify context of one or more user utterances.

In some embodiments, the NLU engine 130a includes a machine-learning natural language engine configured to provide natural language understanding based on one or more machine-learning generated speech models. The speech models are configured to combine a deterministic (finite state automation (FSA)) models and neural-net models to generate a final speech recognition model configured to provide semantic parsing of user utterances. The speech models may be generated by an NLU training and annotation tool 137 configured to receive a set of training data and one or more machine-learning models. The NLU engine 130a generates one or more speech models 136a-136c according to a training process and the training data stored in a parsing database 139.

In some embodiments, the NLU engine 130a generates and/or receives a plurality of domain-specific speech models 136a-136c configured to provide domain-specific vocabularies, semantic parsing, and/or structures to the NLU engine 130a. In some embodiments, one of the domain-specific speech models 136a-136c is selected based on one or more rules provided by a business rule plugin 160a prior to invoking the NLU engine 130a. In some embodiments, the NLU engine 130a may be accessed through one or more input methods, such as, for example, a web service 141.

In some embodiments, after parsing the user utterance, a reference resolver plugin 132e is configured to invoke a context mining component 140a to resolve any explicit and/or implied references in a user utterance. Context mining is the process of traversing a conversational context of a given user or user-system interaction in order to improve understanding of a most-recent user utterance. For example, in some embodiments, the context mining component 140a is configured to retrieve specific information about and/or infer a relationship between specific entities or intents in a user-system conversation. In some embodiments, a data structure including a sequentially-stored structured-representation of user and system utterances in a conversation provides a contextual record of what was said, by who, and when in a conversation. In some embodiments, the data structure includes metadata relevant to the conversation (or dialogue exchange) between the user and the natural language conversation architecture 102a. For example, an add-to-cart intent may require a predetermined set of entities for execution. If each of the entities has been provided in a prior utterance, the context mining component 140a identifies the missing entities and invokes the task stitcher 150a to execute the intent without requiring additional input from the user.

Figure 6A:
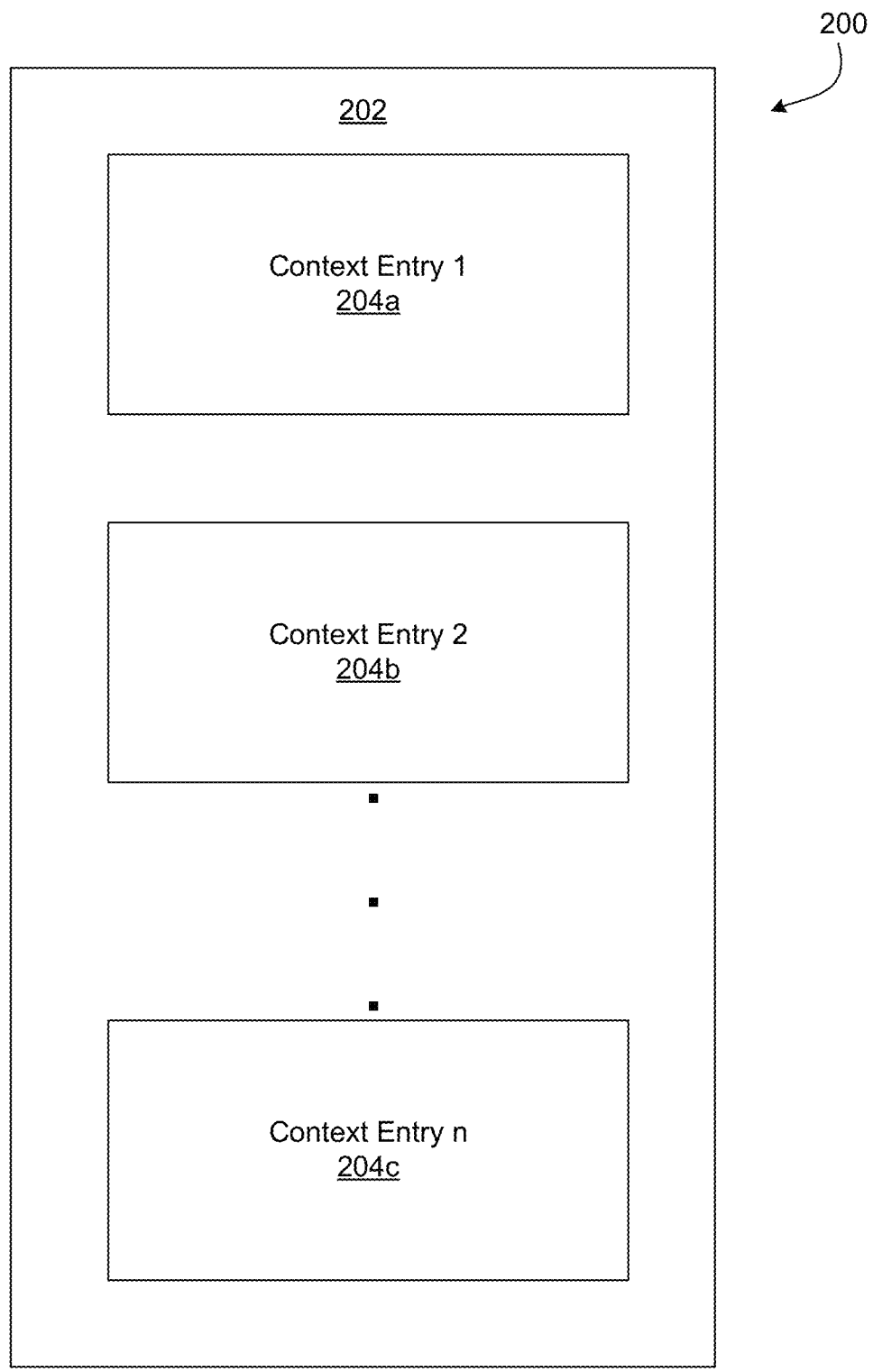
FIG. 6A illustrates a context model data structure configured to maintain a context stack including user and system utterances, in accordance with some embodiments.

FIG. 6A illustrates a context model data structure 200 configured to maintain a context stack 202 including user and system utterances, in accordance with some embodiments. The context stack 202 includes a plurality of context entries 204a-204c, each corresponding to an intent identified by the NLU engine 130a in a user utterance. For example, each context entry 202a-202c can include an intent associated with a specific environment such as intents associated with an e-commerce environment, including, but not limited to, an add to cart intent, a search intent, a product information intent, and/or any other suitable intent. Each context entry 204a-204c within a context stack 202 includes a predetermined structure, as illustrated in FIG. 6B.

Figure 6B:
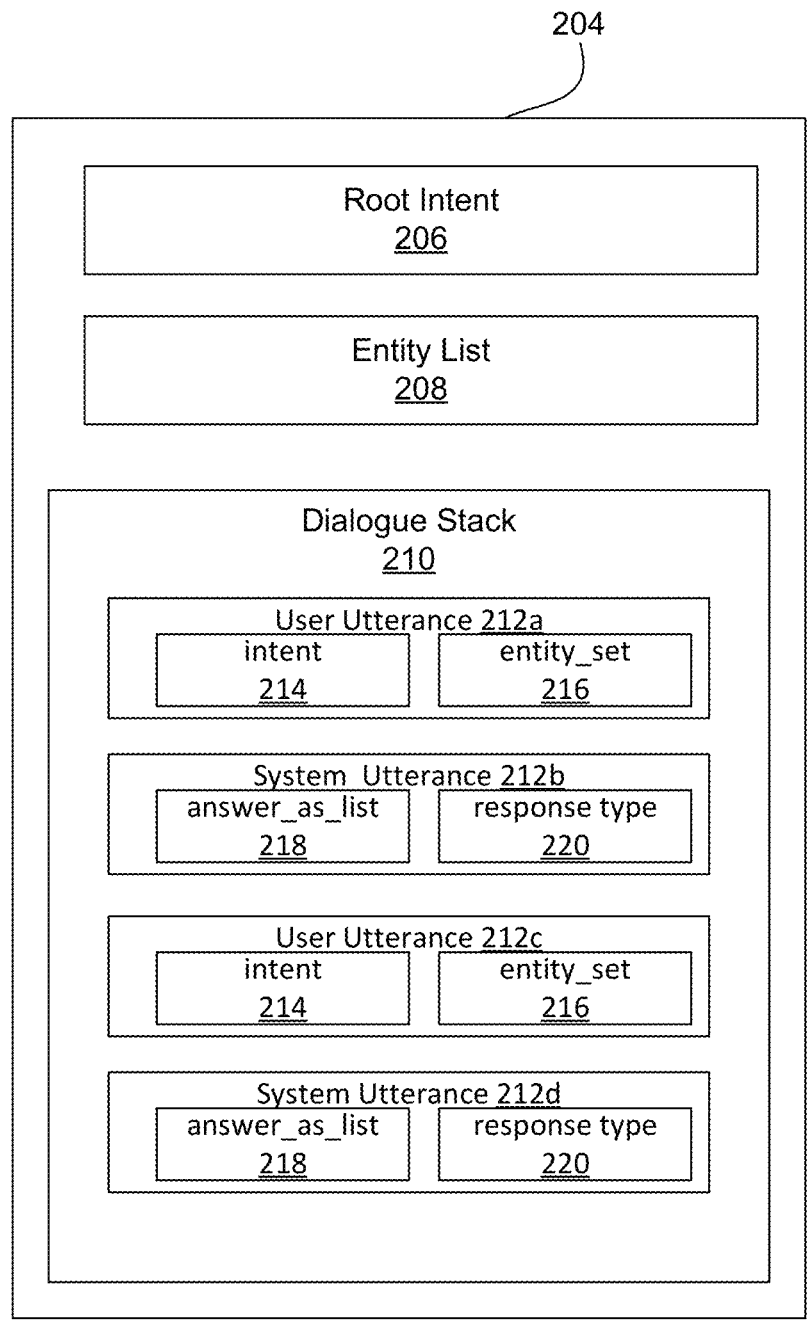
FIG. 6B illustrates a context entry of the context stack of FIG. 6A, in accordance with some embodiments.

As shown in FIG. 6B, in some embodiments, each context entry 204 includes a root intent 206. The root intent 206 includes an intent specified in a user utterance. In some embodiments, each context entry 204 includes an entity list 208 that identifies the required entities associated with the root intent 206. For example, for an add-to-cart intent, the entity list 208 may include a product entity and a quantity entity. In some embodiments, the entity list 208 may further include optional entities. For example, to continue the add-to-cart intent example, the entity list 208 may further include a brand entity, a size entity, a price entity, etc. Although specific embodiments are discussed herein, it will be appreciated that the entity list can include any suitable entities related to the intent. Intents and associated entities may be specified by, for example, one or more business rules generated by a designer and/or engineer for a selected domain. The entity list 208 is updated as each required and/or optional entity is identified in an utterance.

In some embodiments, each context entry 204 includes a dialogue stack 210 including a plurality of dialogue frames 212a-212d representative of a user utterance or a system utterance in a conversation. In the illustrated embodiment, the context entry 204 includes two dialogue frames 212a, 212c representative of user utterances and two dialogue frames 212b, 212d representative of system-generated utterances. In the illustrated embodiment, the plurality of dialogue frames 212a-212d are maintained in chronological order within the dialogue stack 210, although it will be appreciated that the dialogue frames 212a-212d can be stored in any predetermined and/or searchable order.

In some embodiments, each of the dialogue frames 212a-212d include one or more dialogue elements 214-220 such as an intent element 214 identifying an intent of a user utterance 212a, 212c, an entity set element 216, identifying a set of entities located a user utterance 212a, 212c (for example, quantity, type, brand, product, etc.), an answer as list element 218 configured to maintain a plurality of responsive information (e.g., products, prices, etc.) in a list format for latter recall, and a response type element 220 configured to identify the type of the system utterance, such as, for example, a slot filling response, a success response, an error response, a product information response etc. In some embodiments, the intent element 214 and/or an element in the entity set 216 may be provided by a prior utterance.

Figure 7:
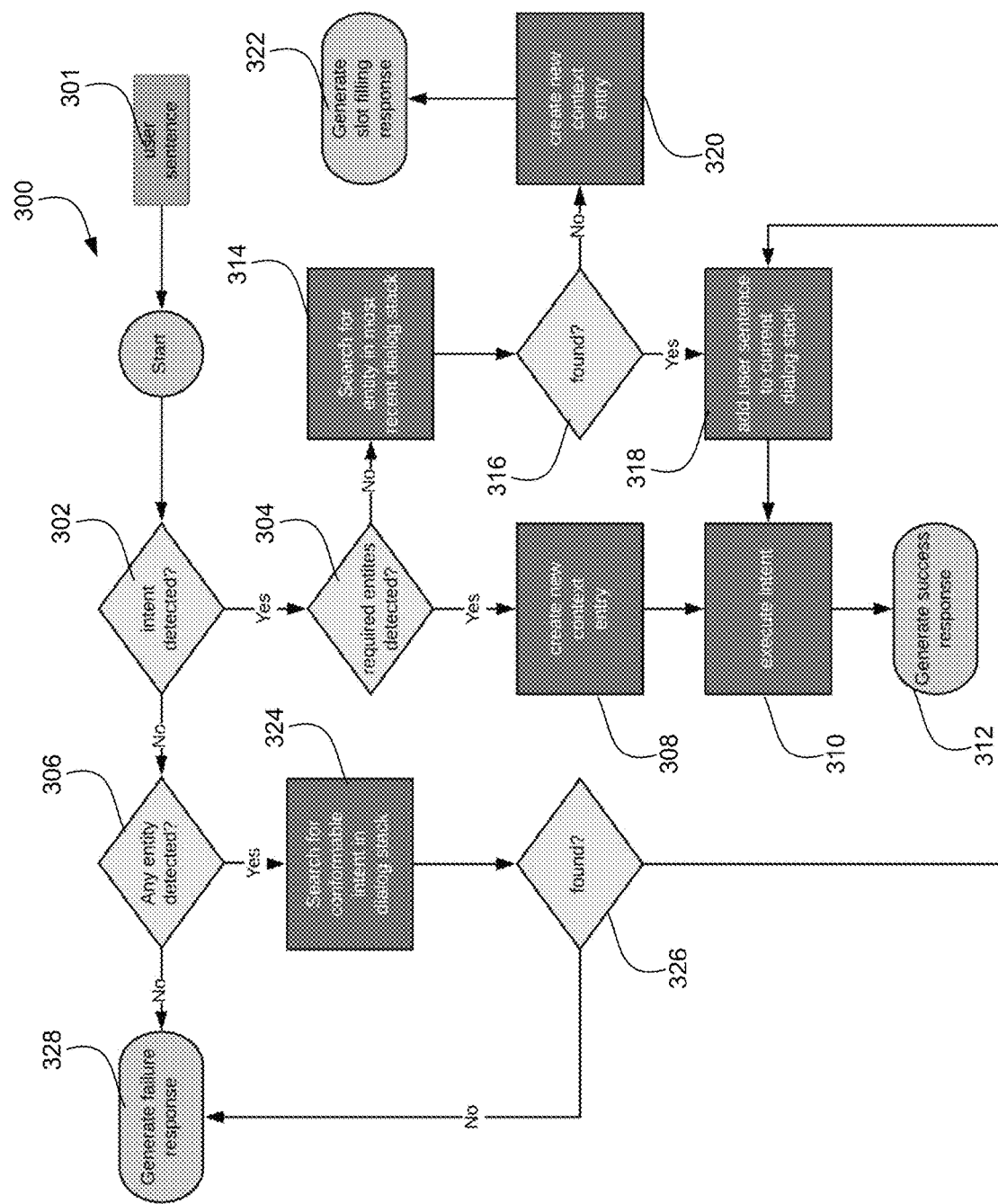
FIG. 7 is a flowchart illustrating a method of intent-entity mining and dialogue stack growth, in accordance with some embodiments.

FIG. 7 is a flowchart illustrating a method 300 for intent-entity mining and dialogue stack growth, in accordance with some embodiments. At step 302, a user utterance 301 is received. The NLU engine 130a processes the received user utterance 301 and to identify an intent within the user utterance 301. If the NLU engine 130a identifies an intent, the method 300 proceeds to step 304. If the NLU engine 130a fails to identify an intent, the method 300 proceeds to step 306.

At step 304, the NLU engine 130a attempts to identify required entities for executing/completing the identified intent. For example, in various embodiments, an intent in the e-commerce space may require one or more of a product entity, a size entity, a quantity entity, a brand entity, or other entities associated with e-commerce transactions. If each of the required identities is provided in the user statement 301, the method 300 proceeds to step 308. If at least one required identity is not identified in the user statement 301, the method 300 proceeds to step 314.

At step 308, a new context entry 204 is generated and added to a context stack 202 associated with the current user. The root intent 206 of the new context entry 204 is set as the intent identified at step 302, each entity identified at step 304 in added to the entity list 208, and a dialogue frame 210a-210d representative of the user utterance 301 is added to the dialogue stack 210. After generating the new context entry 204, the method 300 proceeds to step 310 and executes the intent. To continue the example from above, if the identified intent includes is an add-to-cart intent, the natural language conversation architecture 102a executes the add-to-cart intent to add the identified product to the cart. The method 300 proceeds to step 312 and generates a success response, as discussed in greater detail below with respect to FIGS. 12-13. The success response indicates a successful execution of the identified intent to the user.

As discussed above, if the user utterance 301 does not include at least one required entity, the method 300 proceeds to step 314. At step 314, the context mining element 140a review dialogue frames 212a-212d in the dialogue stack 210 of the most-recently generated context entry 204 to identify the one or more missing entities. In some embodiments, the context mining element 140a searches through each dialogue frame 212a-212d in the dialogue stack 210 in reverse-chronological order (i.e., most recent dialogue frame first) to attempt to identify the missing entity or entities. At step 316, the context mining element 140a determines whether the missing entity or entities have been identified. If all of the missing entities are identified in the dialogue stack 210, the method 300 proceeds to step 318, and the natural language conversation architecture 102a adds a dialog frame 212a-212d representative of the user utterance 301 to the dialogue stack 210 of the currently active context entry 204 and proceeds to step 310, which is discussed above.

If at least one entity remains unidentified, the method 300 proceeds to step 320. The context mining component 140a generates a new context entry 202a-202c. The generated context entry 202a-202c includes the currently identified intent as a root intent, any entities required to execute the intent in the entity list, and places the user statement 210e into the dialogue stack of the generated context entry 202a-202c. The method proceeds to step 322 and generates a slot filling response. The slot filling response prompts the user to provide the missing entities to complete the intent. For example, if the user intent is "add to cart" and the missing entities include a quantity, the natural language conversation architecture 102a, using the task stitcher 150a and the response generator 160a, may generate a slot filling response of "how many" to prompt the user to provide a quantity entity. Although specific examples are discussed herein, it will be appreciated that response generator 160a can generate any suitable slot filling response, as discussed in greater detail below.

As discussed above, if an intent is not identified at step 302, the method 300 proceeds to step 306, and the natural language conversation architecture 102a determines if any entities are identified in the user utterance 301. As discussed previously, potential entities included in a user utterance 301a may be include environment-specific entities (e.g., an e-commerce environment may have a first set of expected entities), domain-specific entities (e.g., a grocery domain may have a second set of expected entities), and/or any other suitable entity context. If the NLU engine 130a identifies one or more entities, the method 300 proceeds to step 324 and reviews the dialog stack 210 and/or the context stack 202 for an intent that matches the entity or entities identified in the user utterance 301. At step 326, the natural language conversation architecture 102a determines if a matching intent was identified. If a matching intent is identified, the method 300 proceeds to step 318, discussed above. If a matching intent is not found at step 326 or no entities are identified at step 306, the method 300 proceeds to step 328 and generates a failure response to indicate the failure of the natural language conversation architecture 102a to understand the user utterance 301.

In some embodiments, a context model data structure 200 maintains a formal representation of conversational context, including a plurality of variables or functions configured to represent a status of the conversation and/or a user utterance. For example, in some embodiments, a formal representation of conversation context may include, but is not limited to, a set of variables and/or functions including:

$I=\{i_1, i_2, \ldots, i_n\}$, representative of the set of all intents;
$E=\{e_1, e_2, \ldots, e_n\}$, representative of the set of all entities;
ReqEnt(i), representative of the set of entities needed to process an intent i, where $i \in I$
AllEnt(i), representative of a set of all entities that are relevant for intent i, where $i \in I$. ReqEnt(i)$\subseteq$AllEnt(i)
Needs(e)=$\{i: e \in ReqEnt(i)\}$, representative of a set of all intents for which e is required
RelevantFor(e)=$\{i: e \in AllEnt(i)\}$, representative of a set of all intents for which e is relevant
UU=(i, Es, Ts), representative of a User Utterance, e.g., a triplet of the intent i ($\in I$), some entities Es ($\subseteq E$), and timestamp Ts
CU=(rt, rd, Ts), representative of a System Utterance, e.g., a triplet of a reply type rt, reply data rd and timestamp Ts
rt$\in$\{terminal:success, terminal:failed, nonterm:question: (boolean|set):(boolean_target|set):(closed|open)\}
rd=[(e1, v1), ...], a, possibly empty, list of entity names and entity values In some embodiments, the context model data structure 200 may augment user and/or system utterances to add additional context or information. For example, and without limitation, a unique utterance id (uid) may be generated for each utterance, an utterance may include a reference to a prior utterance (reference to prior uid), an intent may be modified with a Boolean identifying whether the intent has been completed, etc. In some embodiments, the references to prior uids (e.g., crefs) are generated by the context mining component 140a during a context mining process. In some embodiments, the natural language conversation architecture maintains a conversation context initiated by a user utterance and completed by a system utterance, e.g.,:

Context=$UU(UU|CU)*CU$

In some embodiments, each user utterance may be classified using one or more interaction variables. In some embodiments, the interaction variables are configured to model the type of user utterance received. For example, in some embodiments, the set of interaction variables applied to each user utterance may include, but is not limited to:

A: UU.i$\neq\phi$, which identifies whether an intent is present in UU. Boolean. A=1 if yes, else A=0
B: ReqEnt(UU.i)$\subseteq$UU.Es, which identifies whether all entities required by UU.i are present in UU.Es. Boolean. B=1 if yes, else B=0
C: UU.Es$\neq\phi$, which identifies whether any entities are present at all in UU. Boolean. C=1 if yes, else C=0
D: cref jump<=1, which identifies whether UU refers to just the previous CU or to nothing at all. Boolean. D=1 if yes, else D=0
E: cref$\rightarrow$CU, which identifies whether cref refers to a CU. Boolean. E=1 if yes, else E=0=>refers to UU or nothing at all
F: cref type: Set
  when E=1 (=>referring to CU)
    F=0: Context[cref].rt=question
    F=1: D=1 and Context[cref].rt$\neq$question
    F=2: D=0 and USING Context[cref].rd.E
    F=3: D=0 and REFERRING to Context[cref].rd.E
  when E=0 (=>referring to UU or nothing at all)
    F=0: EDIT UU[cref].Es
    F=1: USE UU[cref].Es
    F=2: INFER UU[-1].i using UU[cref].i (infer open intent)
    F=3: NULL no reference.

Figure 8:
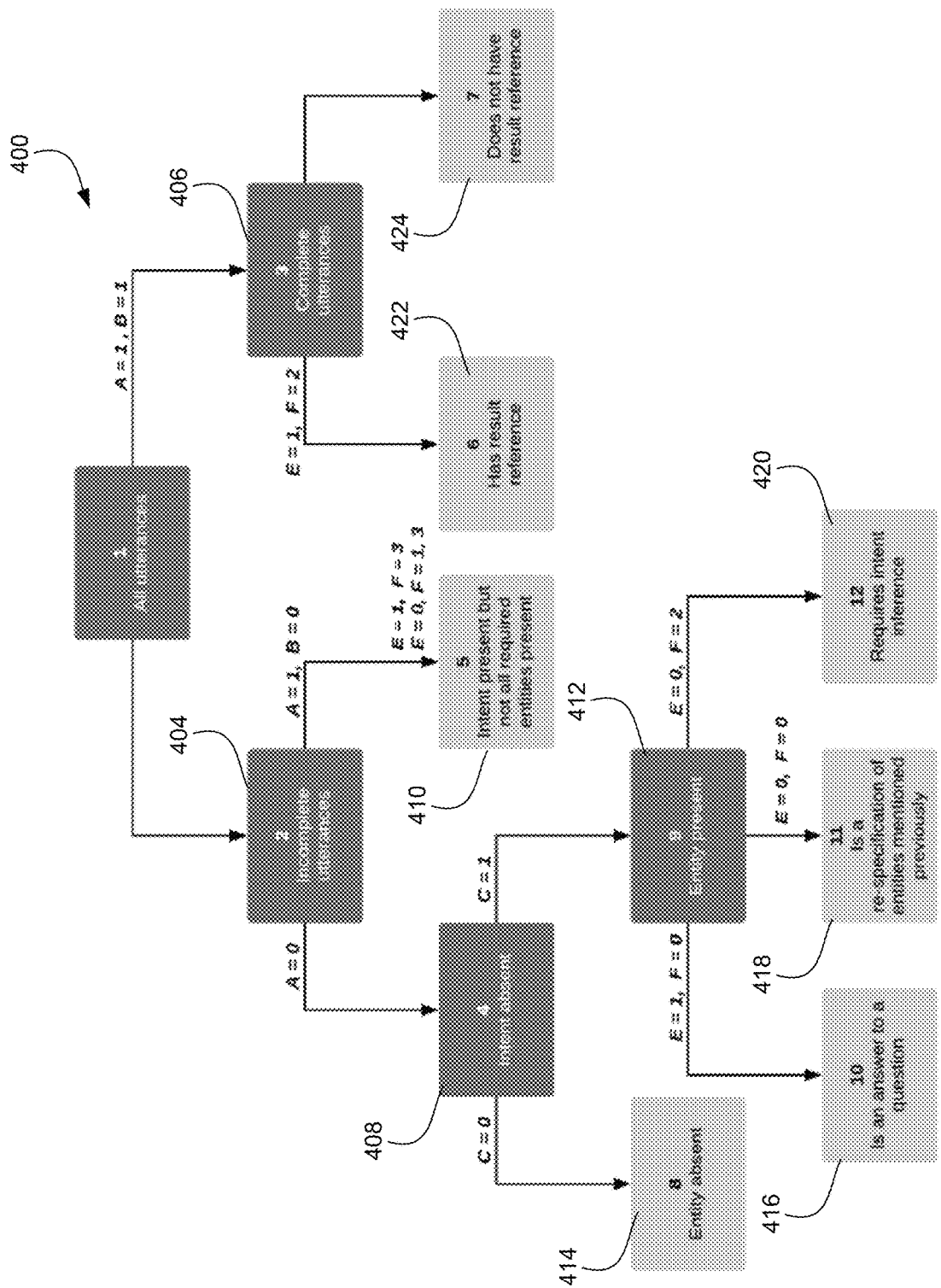
FIG. 8 is a flowchart illustrating a method of context mining, in accordance with some embodiments.

The disclosed variables may be used to classify and/or process each received user utterance according to a predetermined intent-entity mining process. For example, using the above example, each user utterance may be represented as a sequence of 5 binary digits (e.g., values of A-E) and one quaternary digit (e.g., value of F). In some embodiments, multi-turn utterances provide context for interpreting a user utterance and representing the user utterance according to the disclosed models. For example, in some embodiments, two user utterances may be considered fundamentally different if their representations according to the above model are different. An example of a conversation including classifications according to the disclosed model is provided below:

UU>Add apples to cart (101103)
CU>Sure, I can get you gala apples, sold individually for 58 cents. How many do you need?
UU>What's the maximum that I can add (100113)
CU>24
UU>Ok add 10 (001010)
CU>Ok added 10 gala apples to your cart
UU>By the way, are they rich in iron (100113)
CU>Yes apples are very rich in iron. 1 serving of apple, which is usually x grams, satisfy y % of your daily iron needs
UU>Ok then let's do 15 (001000)
CU>Ok changed your cart to make it 15 apples FIG. 8 is a flowchart illustrating a classification 400 of utterances used by the context mining component 140a according to the model discussed above, in accordance with some embodiments. A first node 402 represents a set of all utterances that may be received by the natural language conversation architecture 102a. Node 402 is subdivided into node 404 representing a set of incomplete utterances and node 406 representing a set of complete utterances 406. Node 404 may be further divided into a leaf 408 representing a set of utterances including an intent but missing at least one required entity and a node 410 representing a set of utterances missing an intent. Node 410 is subdivided into a node 412 representing a set of utterances having at least one required entity present and a leaf 414 representing set of utterances lacking both an intent and an entity. Node 412 is subdivided into leaf 416 representing a set of utterances that are an answer to a previously posed question, a leaf 418 representing a set of utterances that are a re-specification of entities already mentioned, and leaf 420 representing a set of utterances that require intent inference. Similarly, node 406 is subdivided into a leaf 422 representing a set of utterances having a result reference and a leaf 424 representing a set of utterances not having a result reference.

In some embodiments, a context mining algorithm may be applied at each node and/or leaf within the classification 400 illustrated in FIG. 8. For example, in some embodiments, a specific context mining process and/or portion of a context mining process may be applied at each node of the categorization scheme 400 to sort a received user utterance into an appropriate leaf and apples a predetermined process at each leaf. In some embodiments, the natural language conversation architecture 102*a* applies a predetermined logic check against variables A and B to determine a sub-node for continued processing and sorting of a user utterance. For example, in the illustrated embodiment, the natural language conversation architecture 102*a* applies a logic check of: if A==1 and B==1, go to node 406, else go to node 404. That is, the natural language conversation architecture 102*a* checks to see if both an intent and all required entities are present.

If both A and B are set to 1, indicating the presence of both intent and required entities, the context mining process proceeds to node 406 and determines whether the current utterance refers to a previous utterance. For example, in some embodiments, given a complete user utterance (i.e., A==1, B==1), the natural language conversation architecture 102*a* checks the context stack to determine if the identified intent of the current statement is located within the context stack and is in an open state, indicating a reference to a previous utterance. If the current user utterance refers to a prior utterance, the context mining process classifies the user utterance in leaf 422 and the user utterance is processed by a previous result handling process that generates tasks and/or responses with knowledge of the referred result by the task stitcher 150*a* and the response generator 160*a*, as discussed in greater detail. If the current user utterance does not reference a prior utterance, the user utterance is classified in leaf 424 and the user utterance is processed according to a normal intent processing flow, as discussed in greater detail below.

Referring back to node 402, if the context mining process determines that at least one of A and B are set to 0, the context mining process proceeds to node 404. At node 404, the context mining process checks the value of A to determine whether an intent is present. If A==1 (indicating an intent is present but at least one required entity is missing), the user utterance is classified in leaf 408. In some embodiments, when a user utterance is classified in leaf 408, the context mining element 140*a* is configured to review the dialogue stack 210, up to predetermined number of frames 212*a*-212*d*, to determine if the one or more missing entities have been previously identified. If the missing entities are identified within the dialogue stack 210, the task stitcher 150*a* processes the current intent using the identified entities. If at least one necessary entity is not identified in the dialogue stack 210, the task stitcher 150*a* and/or the response generator 160*a* generate a slot filling response to prompt the user to supply the missing entities.

If, at node 404, the context mining process determines A==0 (indicating a missing intent), the context mining process proceeds to node 410 and determines whether the user utterance includes at least one entity. For example, in the illustrated embodiment, the context mining process checks the value of variable C to identify the presence (C==1) of at least one entity or the absence (C==0) of any entity. If C==0 (e.g., no entities identified), the context mining process classifies the user utterance in leaf 414. In some embodiments, the task stitcher 150*a* and/or the response generator 160*a* are configured to generate an error response when a user utterance is classified in leaf 414, indicating the user utterance cannot be processed.

If, at node 410, the context mining process determines if at least one entity is identified (C==1), the context mining process proceeds to node 412 and determines the type of user utterance that was received. For example, in some embodiments, the context mining element 140*a* first determines if the dialogue stack 210 contains an open slot filling question for the entity included in the user utterance. If the context mining element 140*a* identifies an appropriate open slot filling question, the user utterance is classified in leaf 416 and handled by the task stitcher 150*a* as a slot filling intent.

If the context mining element 140*a* does not identify an appropriate open slot filling question, the context mining process determines if the user utterance is a re-specification of one or more previously provided entities. For example, in some embodiments, the context mining element 140*a* determines if the context stack contains an intent that was recently executed (e.g., the intent was executed within a predetermined number of dialogue frames 212*a*-212*d* or within a predetermined time period). If a recent intent is identified, the context mining element 140*a* determines whether the recent intent can be re-executed with the entity received in the current utterance. If the recent intent can be re-executed, the content mining element 140*a* classifies the user utterance in leaf 418 and invokes the task stitcher 150*a* to re-execute the intent with the updated entity information.

If a recent intent is not identified, or an identified intent cannot be re-executed with the provided entity, the context mining process determines if an intent can be inferred from the entity or entities in the user utterance For example, in some embodiments, the context mining element 140*a* examines the context stack 202 to determine if a recent or open intent in the context stack 202 matches the identified entity in the user utterance. If the entity matches an open intent, the context mining element 140*a* classifies the user utterance in leaf 420 and processes the user utterance in conjunction with the identified open intent. If the context mining element 140*a* is unable to associate the user utterance with an open intent, an error message is generated by the task stitcher 150*a* and/or the response generator 160*a*. Although a specific embodiment of a context mining process and associated classifications has been disclosed herein, it will be appreciated that the context mining process can include additional, fewer, and/or alternative leafs and/or nodes, the leafs/nodes can be rearranged, and/or alternative or additional processing can be performed at each node, and is within the scope of this disclosure.

With reference again to FIG. 4, in some embodiments, after the context mining element 140*a* classifies the user utterance, a intent processor plugin 132*f* invokes a task stitcher 150*a* to execute an intent or task flow associated with an intent identified by the NLU engine 130*a* and/or the context mining element 140*a*. In various embodiments, the task stitcher 150*a* is configured to execute a plurality of intent flows using granular and reusable processing blocks to implement one or more predefined task flows. The intent flows and/or the task flows may be provided by one or more designers and/or engineers, as discussed in greater detail below. In some embodiments, the intent flow and/or associated task flows can be generated from a subsets of the reusable processing blocks based on one or more rules associated with a specific environment, domain, intent, etc. For example, in the illustrated embodiments, the second instance of the business rule plugin 160*b* may be configured to provide intent and/or task specific flows to the task stitcher 150a for executing an identified intent.

The task stitcher 150a provides a configurable user experience by allowing designers and/or engineers to add and/or modify processing blocks. The task stitcher 150a decouples the intent processing logic from the NLU engine 130a and provides multi-tenant support. In some embodiments, the task stitcher 150a includes a plurality of intent flows each including a subset of the processing blocks and configured to execute a specific intent within a specific domain.

Figure 9:
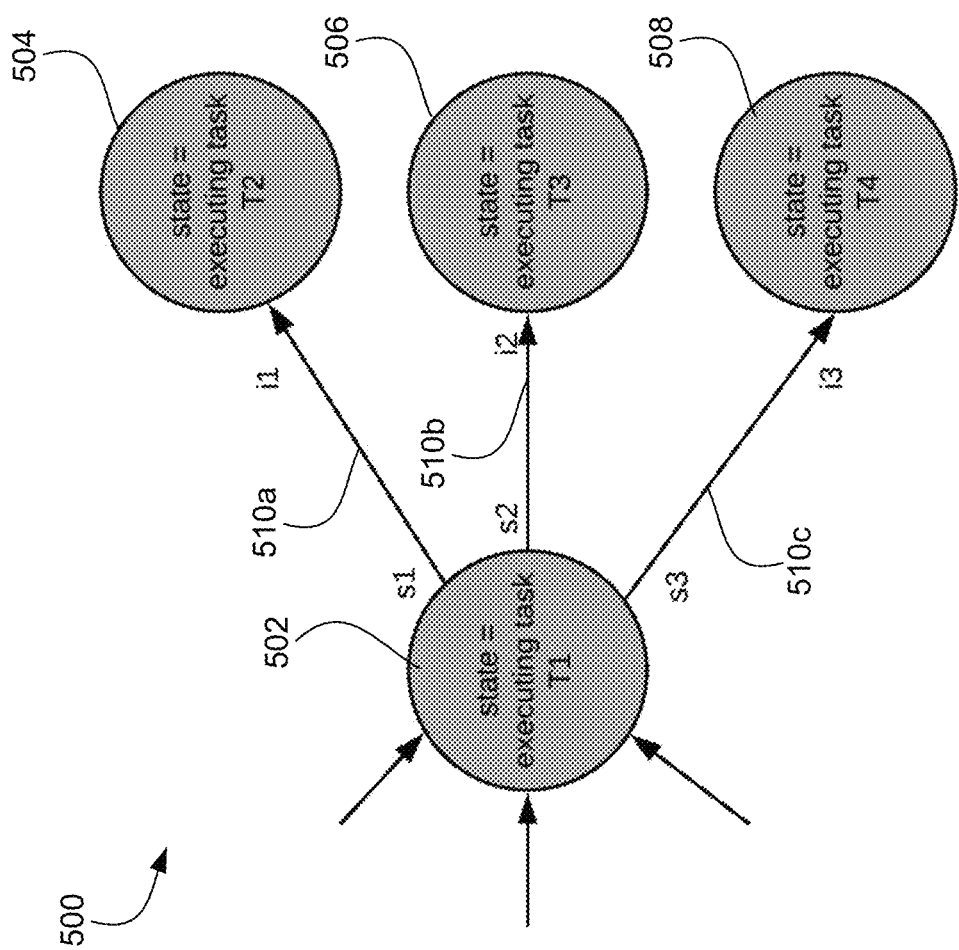
FIG. 9 is a state transition diagram illustrating an intent handler of the natural language conversation system of FIG. 4, in accordance with some embodiments.

FIG. 9 is a finite state machine 500 illustrating an intent flow implemented by a task stitcher 150a, in accordance with some embodiments. The steps for executing a specific intent are divided into a number of states 502-508 and state transitions 510a-510c by the task stitcher 150a, for example, based on an intent flow provided to the task stitcher 150a. Each state 502-508 is representative of a task that is executed by the task stitcher 150a to execute an identified intent. Each task (e.g., state 502) accepts a set of input data and produces a set of output data and one of a predetermined set of states 504-508. The selected output state 504-508 is provided as an input to the state machine 500 and determines which task (e.g., state) is then executed. The task stitcher 150a is configured to identify the task flow specifications for the identified intent and effect the necessary state changes to process each task in the intent flow. In some embodiments, the task stitcher 150a operates as a task executor service and provides input/output between tasks and/or provides data at the edges (e.g., initial input or final output).

Figure 10:
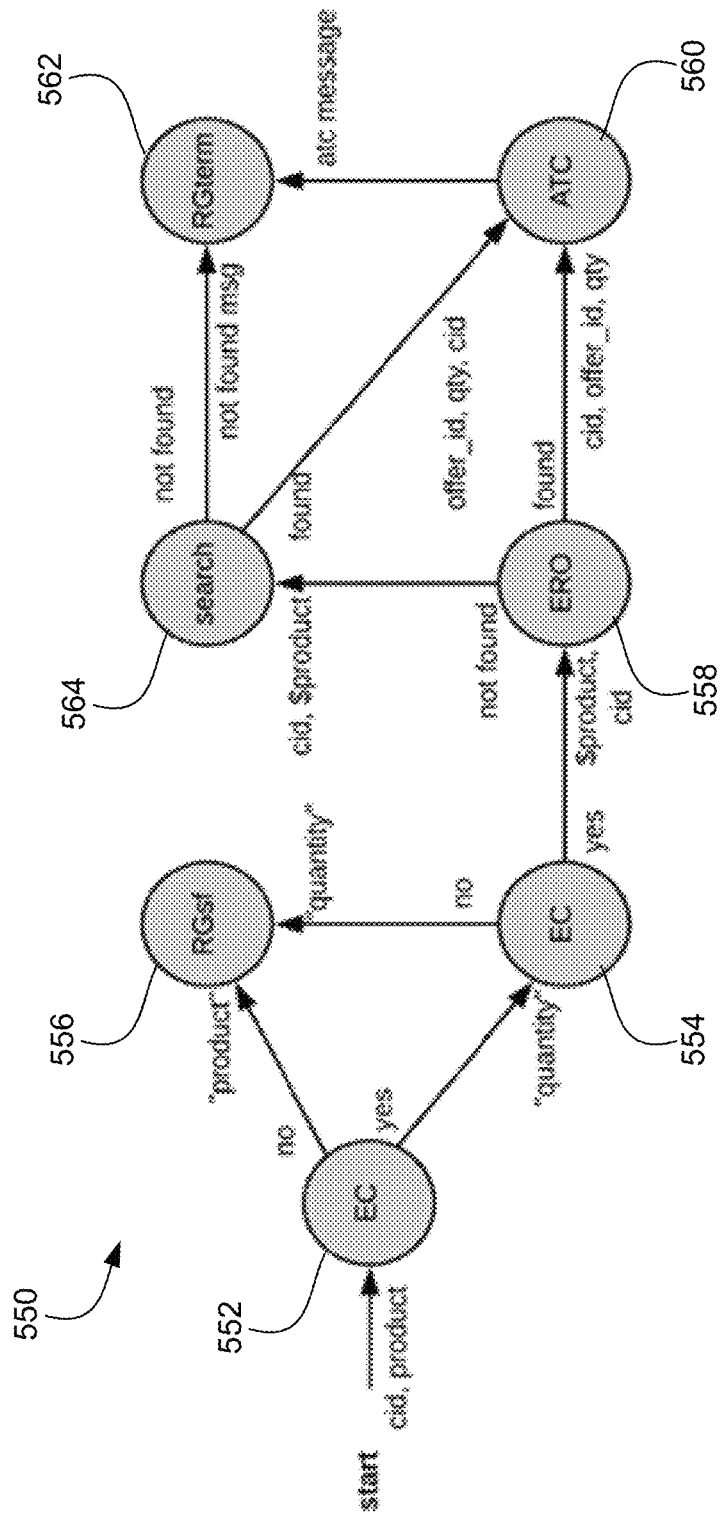
FIG. 10 is an example state transition diagram illustrating a task flow graph of the intent handler of the natural language conversation system of FIG. 4, in accordance with some embodiments.

FIG. 10 illustrates an add-to-cart task flow 550 implemented by the task stitcher 150a, in accordance with some embodiments. The add-to-cart task flow 550 receives a customer identification (CID) entity and, optionally, a product entity. At state 552, the task stitcher 150a executes a task to determine if a product entity (e.g., a required entity identifying the product) was provided in the input data. If the product entity was provided, the task stitcher 150a proceeds to state 554, which invokes response generation task to enable the response generator 160a to generate a slot filling request for the missing product entity. After executing the response generation task 554, task stitcher 150a completes processing of the current intent and the natural language conversation architecture 102a waits for a user response to the slot filling response. A new or existing intent is identified based on the user response and is executed by the task stitcher 150a.

If the product identity is present, the task stitcher 150a proceeds to state 556 and executes a task to determine if a quantity entity (e.g., a required entity identifying the quantity of the product entity) is present. The quantity entity may only be required for certain add-to-cart task flows. If the quantity entity is not present, the task stitcher 150a proceeds to task 554, which executes a response generation task to generate a slot filling request for the quantity entity. It will be noted that the same state 554 is used to execute the response generation task for generating the slot filling request for a missing product identity and a missing quantity entity, as state 554 is a reusable processing block. The output of the response generation task executed at state 554 is dependent on the input provided by the task stitcher 150a as generated by the state 552, 556 immediately preceding the transition to state 554.

If the quantity entity is present, the task stitcher 150a transitions to state 558 and executes a task to determine if a price entity (e.g., a required entity identifying the cost of each unit of the product entity) is present. If the cost entity is present, the task stitcher 150a transitions to state 560 and executes an add-to-cart task to add the product (identified by the product entity) at the quantity (quantity entity) and price (price entity) to the user's cart (CID entity). The task stitcher 150a proceeds to state 562 and executes a response generation task to generate a success response.

If the price entity is not present, the task stitcher 150a proceeds to state 564 and executes a search task to search for the price of the product, for example, within a system database associated with products in a specific domain, store, website, etc. If the price entity is identified during the search task 564, the task stitcher 150a is proceeds to task 560 and executes the add-to-cart task, as discussed above. If a price entity is not identified, the task stitcher proceeds to state 562 and executes a response generation task to generate an error response indicating that the requested add-to-cart intent could not be completed. As with state 554, it will be noted that the response generation task executed at state 562 is dependent on the output of the preceding state 560, 564.

Figure 11:
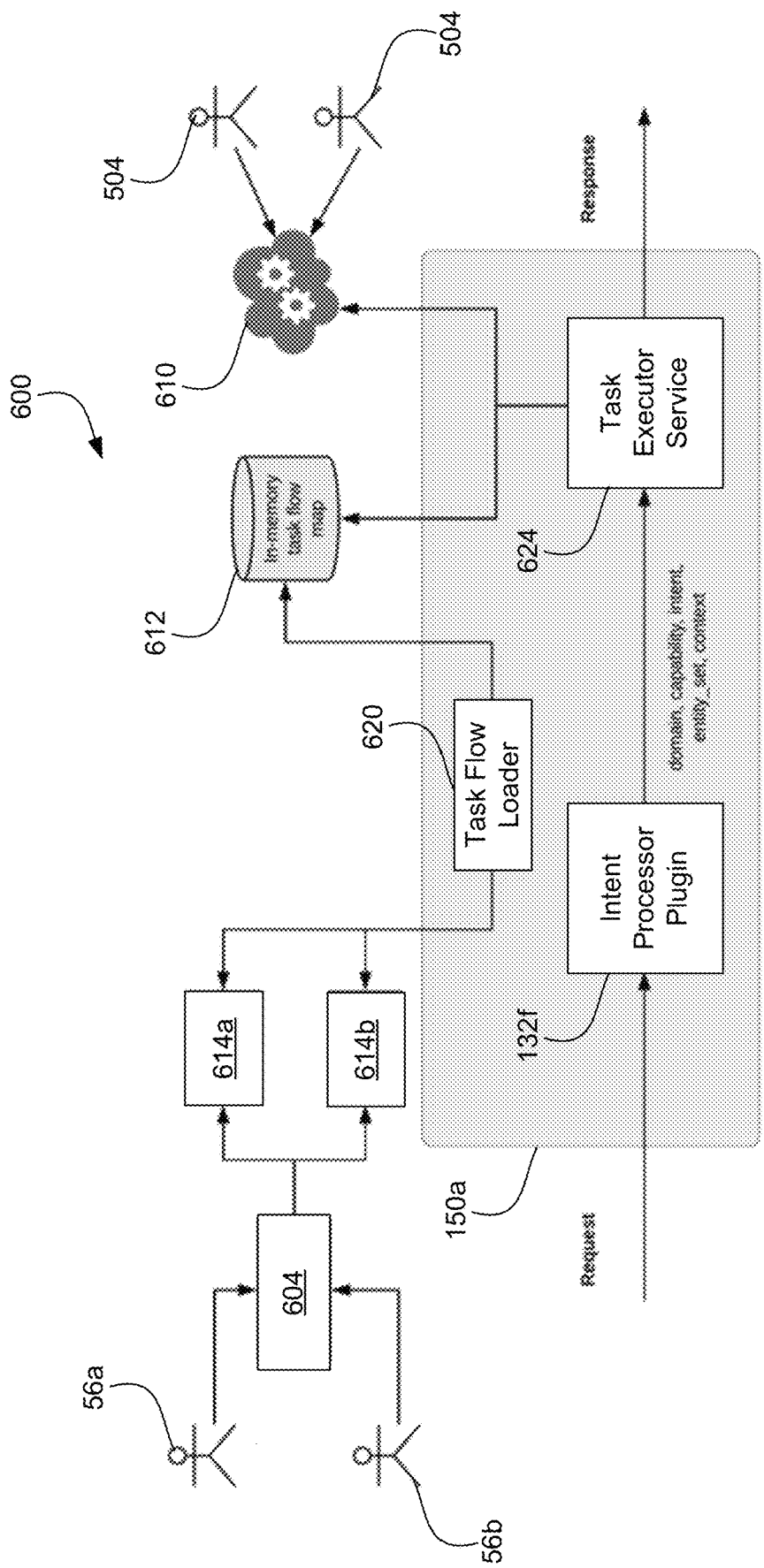
FIG. 11 illustrates a multi-tenant user flow for authoring responses using the intent handler of the natural language conversation system of FIG. 4, in accordance with some embodiments.

FIG. 11 illustrates a multi-tenant user flow 600 configured to provide multi-tenant response authoring for a task stitcher 150b, in accordance with some embodiments. In some embodiments, multiple user interface design systems 56a, 56b interact with a task flow authoring system 604 to generate one or more intent flows and/or task flows to be implemented by the task stitcher 150a. The intent/task flows can include a plurality of processing blocks stitched together to provide a predetermined user experience based on an identified intent, task, domain, environment, input state, etc. In some embodiments, the interface designer systems 56a, 56b are limited to a predetermined set of processing blocks generated by one or more engineer systems 58a, 58b. The engineer systems 58a, 58b interact with the task generation system 610 to generate processing blocks for specific domains, environments, etc. The generated processing blocks may be stored in a database 612 containing task flows, intent flows, etc. and the associated processing blocks. Each of the designer systems 56a, 56b access a flow repository 614a, 614b associated with a specific domain and can generate intent flows from the predetermined task flows in the database 612. The intent flows and associated task flows are implemented by a task flow loader 620 when an intent processing request is received by an intent processing plugin 132f. A task execution service 624 is configured to provide feedback to the database 612 regarding successful and unsuccessful task/intent executions such that the designer systems 56a, 56b and/or the engineer systems 58a, 58b can update the task/intent flows.

Figure 12:
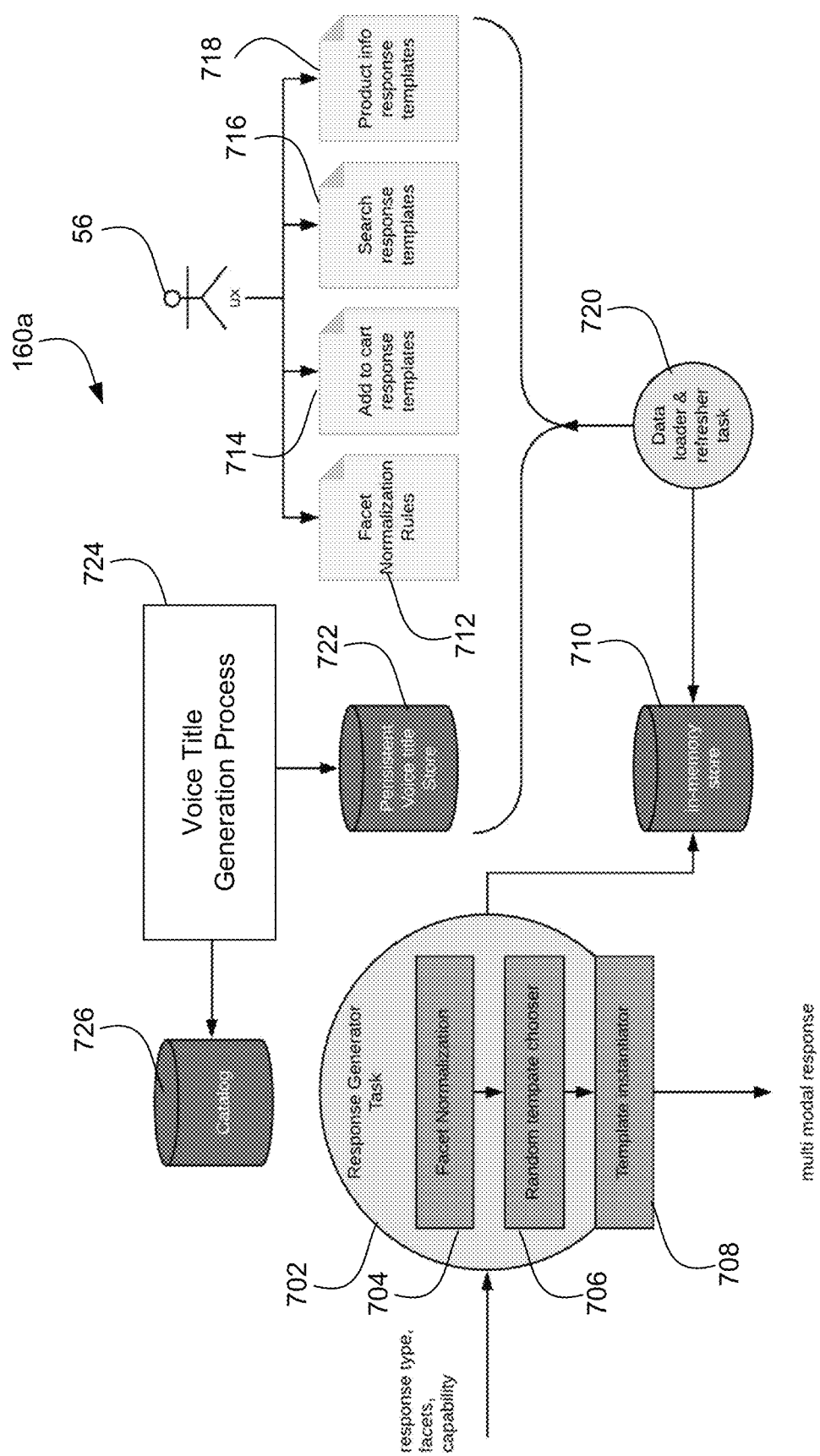
FIG. 12 illustrates a response generation component of the natural language conversation system of FIG. 4, in accordance with some embodiments.

FIG. 12 illustrates a response generation component 160a of the natural language conversation system of FIG. 4, in accordance with some embodiments. In some embodiments, the response generation component 160a is configured to execute a generate response task. The response generation component 160a is configured to apply one or more rules, knowledge bases, etc. to select and instantiate a response template for a selected response type. For example, in an e-commerce environment, the response generation component 160a may be configured to generate a slot filling response (e.g., a request for a missing entity), a success response (e.g., indicate the identified intent has been performed, provide requested information), an error response (e.g., indicate the identified intent cannot be executed), and/or any other suitable response. In various embodiments, the response generation component 160a provides a voice-friendly, frictionless interface that generates a polymorphic, varied, configurable, and multi-modal output to a user based on the user system 52a, 52b, one or more stored response templates, domain-specific rules, environment specific rules, etc.

In some embodiments, the response generator component 160a is configured to execute a response generation task 702. The response generation task 702 receives an input including a response type, entities (or facets) required or optional for executing the intent, and capabilities of the user system 52a, 52b. The response generation task 702 normalizes 704 each entity to a standard format identified by a response database 710. The response database 710 can include a plurality of entity normaliziation rules 712 designed by an interface designer 602a for a specific domain. For example, in various embodiments, the plurality entity normalization rules 712 may include rules for generating one or more versions of a product name, rules for generating prices (e.g., stating twenty-five cents as opposed to 0.25 dollars), rules for generating the sound of the spoken response (e.g., tone)

After normalizing the received entities, the response generation task 702 randomly selects 706 a response template from a plurality of response templates associated with the identified response type. For example, in some embodiments, the database 710 includes a plurality of add-to-cart response templates 714, a plurality of search response templates 716, a plurality of product info response templates 718, and/or any other suitable response templates. Each set of templates 714-718 includes one or more speech templates that are appropriate for responding to the associated intent (e.g., add-to-cart, search, query, etc.). The set of normalization rules 712 and/or the sets of response templates 714-718 can be generated and/or updated by a user interface designer system 56 and stored in the response database 710 by a data loader and refresher task 720 that updates the response database 710. As an example, a set of add-to-cart response templates may include, but is not limited to:

Ok, I've added [SHORT TITLE] to your cart, would you like to add anything else?

Ok I've added [QUANTITY] [SHORT TITLE] to your cart, would you like to add anything else?

Ok, I added [MEDIUM TITLE]. Would you like to add anything else?

The bracketed text indicates versions of normalized entities associated with the specific response templates. For example, each of the response templates includes a [SHORT TITLE] or a [MEDIUM TITLE] indicating a position in the template which a product name must be inserted. The short title can be a short form of the product name (e.g., "milk"), the medium title is a medium form of the product name (e.g., "Great Value 2% milk") and a long title can be a long form of a product (e.g., "Great Value 2% Milk, 1 Gallon"). As another example, a product information response template may include, but is not limited to:

Ok, I can get you a/an [QUANTITY] [UNIT] of [MEDIUM TITLE] for [PRICE]. Would you like to add this to your cart?

The normalized entities of the product information template include a quantity entity (identifying the amount of a product in each unit), a unit entity (identifying the unit of sale for the product), the medium title, and a price entity (identifying the price of the product). Similarly, and as yet another example, a set of templates for a product inquiry in a produce domain (e.g., grocery domain) may include, but are not limited to:

Ok, I can get you [MEDIUM TITLE] sold by [BY UNIT] for [PRICE]. Our average order size is [AVG NUM] [SHORT TITLE], would you like to add this to your cart?

Ok, I can get you [MEDIUM TITLE] sold by [BY UNIT] for [PRICE]. Our average order size is [AVG NUM] [UNIT], would you like to add this to your cart?

Ok, I can get you [MEDIUM TITLE] sold by [BY UNIT] for [PRICE]. Our average order size is [AVG NUM] [UNIT], which is about [AVG COUNT] [SHORT TITLE]. Would you like to add this to your cart?

As can be seen in the produce domain example, the available response templates may be selected based on available entities. For example, the first response template may be used when a produce product is sold individually, the second response template may be used when there is no known average count [AVG COUNT] but there is an average number [AVG NUM] added to a cart, and the third response template may be used when an average count is available. It will be appreciated that the proceeding response templates are provided only as examples. The response generation component 160a can be configured with any response template for any intent based on user experience considerations, domain consideration, environmental considerations, etc.

In some embodiments, a voice store 722 is configured to maintain voice files and/or rules for converting the completed response template into a system utterance for transmission to the user system 52 and conversion to audio. For example, in the illustrated embodiment, the voice store 722 includes a plurality of voice templates and rules generated during a voice title generation process 724 by one or more designer systems 56 and/or engineer systems 58. The voice title generation process 724 generates dialogue responses from a catalog of available voice terms and./or dialogues stored in a voice database 726.

Figure 13:
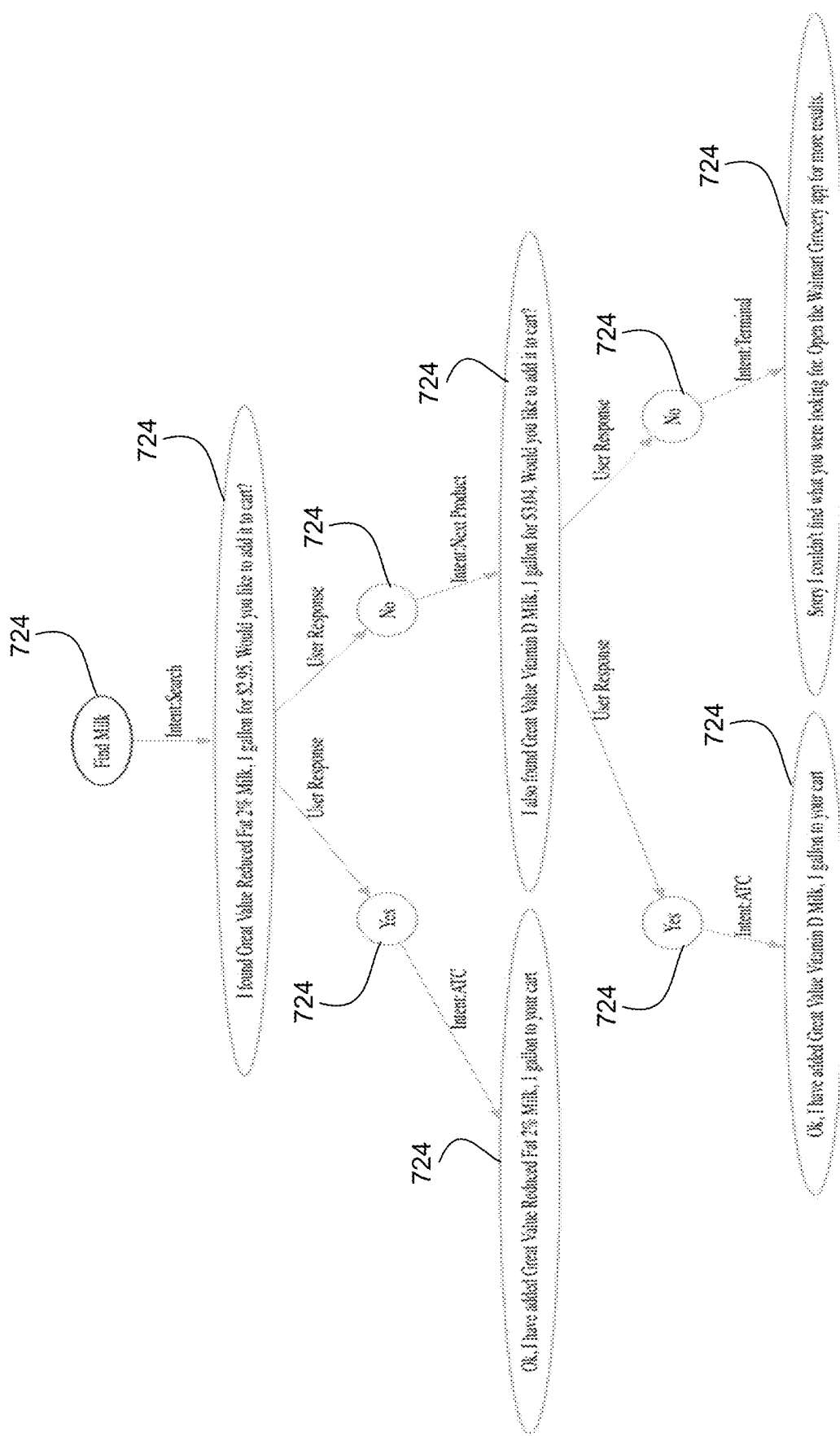
FIG. 13 illustrates a response generation branch visualization for generating a response for a search intent, in accordance with some embodiments.

After selecting a response template, the response generation task 702 instantiates the selected template and provides the required template-filling entities. In some embodiments, the generated response includes a prompt or request for additional information and/or confirmation. For example, FIG. 13 illustrates a branch visualization 750 for response generation in response to execution of a search intent. At a first time, $t_0$, the natural language conversation architecture 102a receives a request 752 from a user to "Find Milk." The NLU engine 130a identifies a search intent and a product entity (e.g., milk) and the task stitcher 150a implements an intent flow to search for the product entity. The search produces one or more results, including a product identified as "Great Value Reduced Fat 2% Milk." At time $t_1$, the response engine 160a instantiates a search response template to generate a search response 754 including a statement indicating a successful search and a prompt for a specific intent, e.g., "I found Great Value Reduced Fat 2% Milk. Would you like to add to cart?"

At time $t_2$, the natural language conversation architecture 102a receives a user response. The response can include an affirmative (e.g., yes) response 756 or a negative (e.g., no) response 758. Although not illustrated, the user response may also include an unrelated response indicating a new intent. If the user response is affirmative, the natural language conversation architecture 102a identifies an add-to-cart intent, which is processed by the NLU engine 130a, the context mining component 140a, and the task stitcher 150a to add the selected product (i.e., "Great Value Reduced Fat 2% Milk") to a cart associated with the user. The response generator 160a instantiates an add-to-cart success response 760 indicating a successful add-to-cart intent at time $t_3$, e.g., "Ok, I have added Great Value Reduced Fat 2% Milk, 1 gallon to your cart." The dialogue tree 750 for responding to a "Find Milk" request is completed when the product is added to the cart.

If the use response is negative, the natural language conversation architecture 102*a* identifies a new product intent, which selects the next product identified during the previously processed search intent, e.g., "Great Value Vitamin D Milk," and instantiates a search response template to generate a second search response 762, e.g., "I have found Great Value Vitamin D Milk, 1 gallon for $3.04. Would you like to add to cart?" The response template randomly selected by the response generator for the second search response template is different than the first search response template and includes the price of the identified product. It will be appreciated that the search response template selected for the second identified product can be the same as and/or different from the search response template selected for the first identified product.

At time $t_4$, the natural language conversation architecture 102*a* receives a user response, e.g., an affirmative response 764, a negative response 766, or an unrelated response (not shown). If an affirmative response 764 is received, the NLU engine 130*a* and the context mining component 140*a* identify an add-to-cart intent and the task stitcher 150*a* executes an add-to-cart intent flow to add the selected product (i.e., "Great Value Vitamin D Milk") to a cart associated with the user. The response generator 160*a* instantiates an add-to-cart success response template to generate a success response 768 at time $t_5$, e.g., "Ok, I have added Great Value Vitamin D Milk, 1 gallon to your cart." It will be appreciated that, although the successful add-to-cart response template selected for the second identified product is the same as for the first product, the possible add-to-cart response templates may include one or more additional response templates that can be selected by the response generation component 160*a*. The dialogue tree 750 for responding to a "Find Milk" request is completed when the product is added to the cart.

If a negative response 766 is received, the natural language conversation architecture 102*a* may continue to select products identified by a prior search and present the products to a user for selection. After the user has rejected a predetermined number of products, the natural language conversation architecture 102*a* identifies a terminal intent, indicating that the natural language interaction should be completed and the user directed to additional resources. For example, in the illustrated embodiment, after presenting two rejected products, the natural language conversation architecture 102*a* identifies a terminal intent and the response generator 160*a* instantiates a terminal response template at time $t_5$ to generate a terminal response 770, e.g., "Sorry I couldn't find what you were looking for." Open the Grocery app for more results." In various embodiments, the terminal response template may be selected based on the additional resource or resources available to the user.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a memory having instructions stored thereon; and
a processor configured to read the instructions to:
obtain, from a database, a context stack comprising a set of context entries, wherein each context entry in the set of context entries comprises a root intent element, an entity list element, and a dialogue stack, and wherein the dialogue stack of each context entry in the set of context entries includes a sequentially-stored structured data representation including least one user utterance and at least one system utterance, wherein each of the at least one user utterance and the at least one system utterance is stored as a data triplet including an intent variable, a set of entity variables and a timestamp;
receive machine-readable data indicative of a first user utterance from a user;
determine at least one existing semantic component, at least one missing semantic component, and an intent of the first user utterance;
identify a first context entry in the set of context entries based on the root intent elements of the set of context entries and the at least one existing semantic component of the first user utterance;
determine whether the at least one missing semantic component is identified within the dialogue stack of the first context entry;
in accordance with a determination that the at least one missing semantic component is identified within the dialogue stack of the first context entry and wherein the at least one missing semantic component includes at least one entity in the set of entities associated with the root intent element of the first context entry:
modify the sequentially-stored structured data representation of the first context entry to include a data triplet of the first user utterance,
generate an intent flow execution request including the at least one missing semantic component; and
in accordance with a determination that the at least one missing semantic component is unidentified within the dialogue stack of the first context entry:
create a new context entry comprising a new dialogue stack that includes a new sequentially-stored structured data representation,
modify the new sequentially-stored structured data representation of the new context entry to include a data triplet of the first user utterance,
generate, in response to the first user utterance, a first system utterance requesting the user to provide the at least one missing semantic component.

2. The system of claim 1, wherein the entity list of each context entry includes a set of entities associated with the root intent element.

3. The system of claim 1, wherein the computing device is configured to modify the first context entry to include the first user utterance.

4. The system of claim 1, wherein the entity list comprises at least one required entity and at least one optional entity.

5. The system of claim 1, wherein the processor is configured to classify the data indicative of the first user utterance in a first class selected from a predetermined set of classes, wherein the intent flow execution request is generated based on the first class.

6. The system of claim 1, wherein the at least one missing semantic component comprises an intent element and the at least one existing semantic component comprises an entity element, and wherein the processor is configured to:
   identify a context entry in the set of context entries including an open intent element having a required entity in the entity list corresponding to the at least one existing semantic component; and
   execute the open intent including the at least one existing semantic component as the required entity.

7. The system of claim 1, wherein the at least one missing semantic component comprises an intent element and the at least one existing semantic component comprises an entity element, and wherein the processor is configured to:
   determine that an entity type of a required entity in the entity list of a recently executed intent matches an entity type of the at least one existing semantic component; and
   execute the recently executed intent using the at least one existing semantic component as the required entity.

8. The system of claim 1, wherein the at least one missing semantic component comprises an intent element and the at least one existing semantic component comprises an entity element, and wherein the processor is configured to:
   determine that a related intent includes the at least one existing semantic component as an optional entity in the entity list; and
   execute the related intent using the at least one existing semantic component as the optional entity.

9. A method by at least one processor, the method comprising:
   obtaining, from a database, a context stack comprising a set of context entries, wherein each context entry in the set of context entries comprises a root intent element, an entity list element, and a dialogue stack, and wherein the dialogue stack of each context entry in the set of context entries includes a sequentially-stored structured data representation including at least one user utterance and at least one system utterance, wherein each of the at least one user utterance and the at least one system utterance is stored as a data triplet including an intent variable, a set of entity variables and a timestamp;
   receiving machine-readable data indicative of a first user utterance from a user;
   determining at least one existing semantic component, at least one missing semantic component, and an intent of the first user utterance;
   identifying a first context entry in the set of context entries based on the root intent elements of the set of context entries and the at least one existing semantic component of the first user utterance;
   determining whether the at least one missing semantic component is identified within the dialogue stack of the first context entry;
   in accordance with a determination that the at least one missing semantic component is identified within the dialogue stack of the first context entry and wherein the at least one missing semantic component includes at least one entity in the set of entities associated with the root intent element of the first context entry:
      modifying the sequentially-stored structured data representation of the first context entry to include a data triplet of the first user utterance,
      generating an intent flow execution request including the at least one missing semantic component; and
   in accordance with a determination that the at least one missing semantic component is unidentified within the dialogue stack of the first context entry:
      creating a new context entry comprising a new dialogue stack that includes a new sequentially-stored structured data representation,
      modifying the new sequentially-stored structured data representation of the new context entry to include a data triplet of the first user utterance,
      generating, in response to the first user utterance, a first system utterance requesting the user to provide the at least one missing semantic component.

10. The method of claim 9, further comprising modifying the first context entry to include the first user utterance.

11. The method of claim 9, further comprising classifying the data indicative of the first user utterance in a first class selected from a predetermined set of classes, wherein the intent flow execution request is generated based on the first class.

12. The method of claim 9, wherein the at least one missing semantic component comprises an intent element and the at least one existing semantic component comprises an entity element, the method further comprising:
   identifying a context entry in the set of context entries including an open intent element having a required entity in the entity list corresponding to the at least one existing semantic component; and
   executing the open intent including the at least one existing semantic component as the required entity.

13. The method of claim 9, wherein the at least one missing semantic component comprises an intent element and the at least one existing semantic component comprises an entity element, the method further comprising:
   determining that an entity type of a required entity in the entity list of a recently executed intent matches an entity type of the at least one existing semantic component; and
   executing the recently executed intent using the at least one existing semantic component as the required entity.

14. The method of claim 9, wherein the at least one missing semantic component comprises an intent element and the at least one existing semantic component comprises an entity element, the method further comprising:
   determining that a related intent includes the at least one existing semantic component as an optional entity in the entity list; and
   executing the related intent using the at least one existing semantic component as the optional entity.

15. A non-transitory computer readable medium having instructions stored thereon, wherein the instructions, when executed by a processor, cause a device to perform operations comprising:
   obtaining, from a database, a context stack comprising a set of context entries, wherein each context entry in the set of context entries comprises a root intent element, an entity list element, and a dialogue stack, and wherein the dialogue stack of each context entry in the set of context entries includes a sequentially-stored structured data representation including at least one user utterance and at least one system utterance, wherein each of the at least one user utterance and the at least one system utterance is stored as a data triplet including an intent variable, a set of entity variables and a timestamp;
   receiving machine-readable data indicative of a first user utterance from a user;

determining at least one existing semantic component, at least one missing semantic component, and an intent of the first user utterance;

identifying a first context entry in the set of context entries based on the root intent elements of the set of context entries and the at least one existing semantic component of the first user utterance;

determining whether the at least one missing semantic component is identified within the diaogue stack of the first context entry;

in accordance with a determination that the at least one missing semantic component is identified within the dialogue stack of the first context entry and wherein the at least one missing semantic component includes at least one entity in the set of entities associated with the root intent element of the first context entry:

modifying the sequentially-stored structured data representation of the first context entry to include a data triplet of the first user utterance, generating an intent flow execution request including the at least one missing semantic component; and in accordance with a determination that the at least one missing semantic component is unidentified within the dialogue stack of the first context entry:

creating a new context entry comprising a new dialogue stack that includes a new sequentially-stored structured data representation, modifying the new sequentially-stored structured data representation of the new context entry to include a data triplet of the first user utterance, generating, in response to the first user utterance, a first system utterance requesting the user to provide the at least one missing semantic component.

16. The non-transitory computer readable medium of claim 15, wherein the instructions, when executed by the processor, cause the device to perform operations comprising modifying the first context entry to include the first user utterance.

17. The non-transitory computer readable medium of claim 15, wherein the instructions, when executed by the processor, cause the device to perform operations comprising classifying the data indicative of the first user utterance in a first class selected from a predetermined set of classes, wherein the intent flow execution request is generated based on the first class.

18. The non-transitory computer readable medium of claim 15, wherein the at least one missing semantic component compries an intent element and the at least one existing semantic component comprises an entity element, wherein the instruction, when executed by the processor, cause the device to perform operations comprising:

identifying a context entry in the set of context entries including an open intent element having a required entity in the set of entities corresponding to the at least one exiting semantic component; and executing the open intent including the at least one existing semantic component as the required entity.

19. The non-transitory computer readable medium of claim 15, wherein the at least one missing semantic component comprises an intent element and the at least one existing semantic component comprises an entity element, wherein the instruction, when executed by the processor, cause the device to perform operations comprising:

determining that an entity type of a required entity in the set of entities of a recently executed intent matches an entity type of the at least one existing semantic component; and executing the recently executed intent using the at least one existing semantic component as the required entity.

* * * * *